(12) United States Patent
Siva et al.

(10) Patent No.: US 12,192,073 B2
(45) Date of Patent: Jan. 7, 2025

(54) ARTIFICIAL INTELLIGENCE BASED SERVICE QUALITY RESPONSE SYSTEM

(71) Applicant: Movius Interactive Corporation, Duluth, GA (US)

(72) Inventors: Ananth Siva, Sydney (AU); Satish Medapati, Bangalore (IN); Aravind Kumar Abbena, Bangalore (IN); Saumya Tripathi, Bangalore (IN); Naresh Vemula, Bangalore (IN); Dipesh Gupta, Bangalore (IN); Amit Modi, Fremont, CA (US)

(73) Assignee: Movius Interactive Corporation, Duluth, GA (US)

( * ) Notice: Subject to any disclaimer, the term of this patent is extended or adjusted under 35 U.S.C. 154(b) by 415 days.

(21) Appl. No.: 17/746,260

(22) Filed: May 17, 2022

(65) Prior Publication Data
US 2023/0379229 A1 Nov. 23, 2023

(51) Int. Cl.
*H04L 41/50* (2022.01)
*H04L 41/16* (2022.01)
*H04L 41/5067* (2022.01)

(52) U.S. Cl.
CPC .......... *H04L 41/5067* (2013.01); *H04L 41/16* (2013.01)

(58) Field of Classification Search
CPC ............................ H04L 41/5067; H04L 41/16
USPC ....................................................... 455/422.1
See application file for complete search history.

(56) References Cited

U.S. PATENT DOCUMENTS

| | | | | |
|---|---|---|---|---|
| 2003/0236087 | A1* | 12/2003 | Stenton | H04M 15/70 455/418 |
| 2013/0032634 | A1* | 2/2013 | McKirdy | G06K 7/1413 235/375 |
| 2016/0008632 | A1* | 1/2016 | Wetmore | A61N 1/36025 607/45 |

* cited by examiner

*Primary Examiner* — Joel Ajayi
(74) *Attorney, Agent, or Firm* — Smith Tempel Blaha LLC; Gregory Scott Smith

(57) ABSTRACT

Artificial intelligence is utilized in gathering, analyzing and processing of user feedback, specifically as pertaining to service quality in a telecommunications system. In response to collecting the feedback data, the system automatically generates reports and initiates remedial measures in response to such user feedback to enhance the performance of the service.

20 Claims, 16 Drawing Sheets

ARTIFICIAL INTELLIGENCE BASED SERVICE QUALITY RESPONSE SYSTEM

CROSS-REFERENCE TO RELATED APPLICATIONS

This application incorporates U.S. Pat. No. 9,332,408, issued on May 3, 2016 and bearing the title of "SYSTEM AND METHOD FOR PROVISION OF A SECOND LINE SERVICE TO A TELECOMMUNICATIONS DEVICE" in its entirety.

BACKGROUND

With the rapid advancements in technology, technology development companies are so consumed with pushing out faster, functionally rich and slick products that it is easy for customer service to go by the wayside. And when the companies to focus on customer service, they often lose sight of real issue—how does the customer perceive the service they are receiving. Instead, the companies focus on metrics that theoretically define and deploy a high quality of service but, the focus is on the technological quality of service and not on the user's perception of the quality of service. For example, a cellular company may provide infrastructure to ensure that they have full coverage of an area but, if the users find that the fidelity of the calls are poor, the user perception is a poor quality of service. However, the service provide may believe that they are fully meeting the expectations of the users by providing such breadth of coverage. What is needed in the art is a technique to receive real-time, consistent, and accurate feedback data from a service provider's user base. Further, what is needed in the art is a technique to process the feedback data to accurately identify the quality of service as is perceived by the user. Finally, once the feedback is received and analyzed, the company needs to be able to take action in accordance with the feedback and close the feedback loop with the service provider's user base. The present disclosure presents embodiments of a system and method to address these needs in the art.

BRIEF SUMMARY

Embodiments of the present invention are related to the application of artificial intelligence in gathering, analyzing and processing of user feedback, specifically as pertaining to service quality in a telecommunications system, and the automatic generation of reports and remedial measures as well as predictive guidance in response to such user feedback.

In general, embodiments of present invention provide artificial intelligence (AI) and a data driven approach for event-based troubleshooting (EBT) to address end user perception versus reality about call quality experiences. The various embodiments may be utilized in a variety of settings, such as the MULTILINE service available from MOVIUS as a non-limiting example. But it will be appreciated that the various embodiments may be utilized in any type of a setting or environment in which users of a service or product have ready access to an electronic device for receiving prompts and/or for providing feedback pertaining to the service or product. Advantageously, the various embodiments operate to provide aggregated and individual telemetry feedback pertaining to end user sentiment, experience, perceptions, etc. (positive or negative). The various embodiments operate to collect and analyze data to identify the performance and quality in the provision of a service from a user's perception of the service (i.e., such as from a user's perspective) rather than actual measured metrics such as the error rate on communication channels, through-put, measured signal-to-noise ratios, etc.

As previously stated, the various embodiments of the present invention may be applied in a wide variety of settings. However, to help understand the operation of the various embodiments, the examples provided herein will focus on just one industry—call processing in a mobile network. In some embodiments applicable to this industry, the end user experiences related to call quality are categorized, such as by labeling them as: good, call drops, lags, audio issues, etc. as a few non-limiting examples. The various embodiments have the added advantage of providing faster troubleshooting and issue resolution. For example, the collections of call logs for a telecommunications service can be automatically obtained and thus the turnaround time for triaging, analyzing and providing feedback on issues can be significantly reduced. Further, the root cause analysis ("RCA") process and feedback loop closure with customers (service provider admin, help desk or end user) can be optimized. The various embodiments operate to provide an overall enhancement to service quality, in reality and in perception.

DETAILED DESCRIPTION OF VARIOUS EMBODIMENTS

The present invention, as well as features and aspects thereof, is directed towards a system and method that employs artificial intelligence in gathering, analyzing and processing of user feedback. A non-limiting example of such operation can be described in relationship to service quality in a telecommunications system, and the automatic generation of reports and remedial measures in response to such user feedback. The various embodiments of the present invention will be called an aggregation, AI-analysis and Addressing system (hereinafter "ARYA").

One aspect of the various embodiments of the ARYA includes a technique to receive real-time, consistent, and accurate feedback data from a service or product provider's user base. In addition, the various embodiments provide a solution for processing the feedback data to accurately identify the quality of service and/or product as is perceived by the user. Finally, the various embodiments include solutions for taking actions and making adjustments to the provision of the service or the quality of the product in accordance with the feedback received.

There are elements and aspects of a user service for which a service provider cannot ascertain. Many of these elements and aspects stem from the issue that measuring the technological performance of a system that is providing a service does not take into consideration the actual customer experience. As a non-limiting example, a cellular service provider and ensure that there is sufficient bandwidth to handle any level of call volume, ensure that blanket coverage is provided over a particular geographic region, that signal level provided over the region is sufficient to ensure that calls are not dropped and that the cellular channels have a limited amount of noise. Thus, from a service provider's perspective, the quality of service should be of the highest caliber. However, the particular telecommunication devices utilized by the users may be plagued with feedback issues, highly sensitive to electro-magnetic radiation in the vicinity, or if the telecommunication devices are mobile they may be highly subject to distortion or dropped calls. These anomalies as well as many other potential anomalies would not typically show up in the afore described metrics gathering and analysis that a service provide may do. However, the anomalies can have a significant adverse impact on the user's perception of the service. As such, the service provide may operate for significant periods of time without ever knowing that the users may be very dissatisfied with the service that is being provided.

Figure 1:
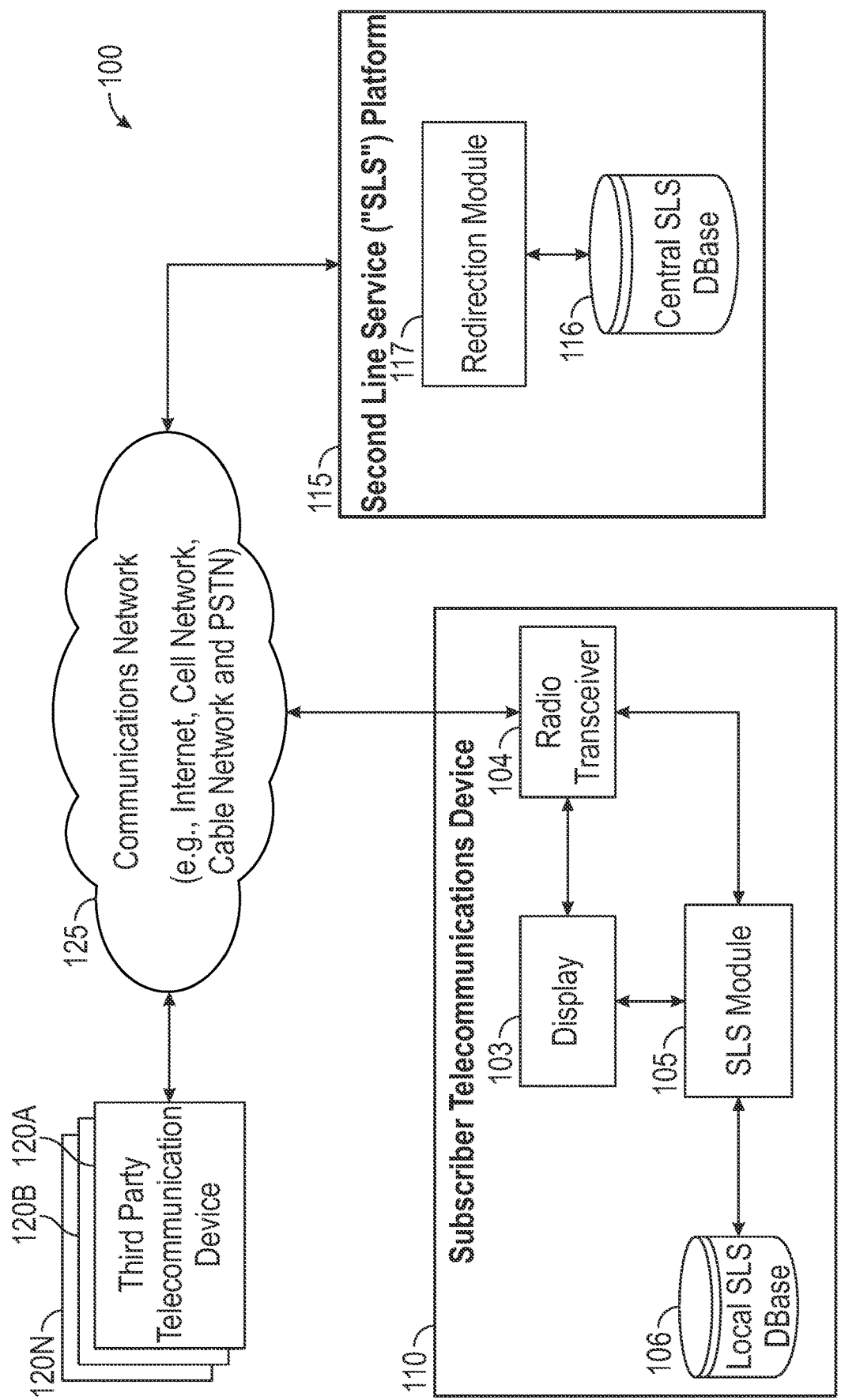
FIG. 1 is an exemplary environment in which embodiments of the ARYA may be deployed.

FIG. 1 is an exemplary environment in which embodiments of the ARYA may be deployed. FIG. 1, depicted is a high-level diagram illustrating exemplary components of a system 100 that is configured to provide a service, such as a telecommunications service. In this case, the telecommunications service is a second line service provided to a user of terminal device ("TD") 110. However, it should be appreciated that embodiments of the present invention could be implemented in a variety of settings and affiliated with a variety of different services and/or multiple services. The services may be telecommunications based, app based, or any type of service that can be provided through electronic devices or that include the provision of a user interface through an electronic device. In FIG. 1, TD 110 is associated with a primary phone number assigned to it by a primary service provider, as is understood by one of ordinary skill in the art, and a second line service ("SLS"). A subscriber to SLS offered through exemplary system 100 may receive calls at TD 110 that are directed to either of the primary phone number provided by the primary service provider or the secondary phone number ("SLS phone number") provided by the SLS platform 115.

In general, any call directed to either of the primary phone number or the SLS phone number are transmitted from a third-party TD 120 to the subscriber TD 110 by way communications network 125. Notably, communications network 125 envisions any and all networks for transmitting and terminating communications between telecommunications devices such as, but not limited to, cellular networks, PSTNs, cable networks, VOIP, radio frequencies and the Internet. Methods for effecting the transmission of data across communications network 125 from one device to another, including call setups, terminations and the like are understood by those of ordinary skill in the art of data transmission.

A call made from a third-party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CLID"), (i.e. the phone number associated with third party TD 120) such that when the call is received at subscriber TD 110, the CLID may be displayed for the benefit of the subscriber on display component 103. Notably, although the exemplary embodiments described in the present disclosure use the CLID as an example of data that may displayed for the benefit of the user of a subscriber TD 110, it will be understood that any data associated with the third party TD 120, subscriber TD 110, SLS platform 115 or the like may be rendered for the benefit of the user of the system 100 and, as such, only describing that the CLID is displayed will not limit the scope of what is envisioned by the disclosure. Moreover, it is envisioned that any data uniquely associated with a call to a primary number or an SLS number may be displayed for the benefit of a subscriber to the system 100.

A call made from a third-party TD 120 to an SLS number associated with subscriber TD 110 is transmitted across network 125. The network 125 recognizes where the call needs to be routed based on the called number (the SLS number associated with the subscriber) and routes the call to SLS platform 115. SLS platform 115 thus effectively intercepts the call, determines that the call was intended for subscriber TD 110 and then forwards the call to subscriber TD 110. In this way, while a call directed to a primary number associated with subscriber TD 110 is routed directly to subscriber TD 110, a call directed to a second line number associated with subscriber TD 110 is routed to SLS platform 115 instead. Once received at SLS platform 115, a query of central SLS database 116 by redirection module 117 may determine that the call from third party TD 120 was meant for the second line number associated with subscriber associated with TD 110. Once the determination is made, redirection module 117 may modify the call data to include data that reflects its identification as a call for the second line number and then forward the call to the primary number associated with subscriber TD 110.

Because the call includes data identifying it as a call to the second line number associated with subscriber TD 110, SLS module or process 105 may intercept the incoming call, or otherwise be injected into the call processing activity for the call, and then leverage data stored in local SLS database 106 to render it in such a way that the user or subscriber associated with TD 110 knows that the call is for the second line number as opposed to the primary number. The SLS module 105 is designed to work with radio transceiver 104 and any stored or retrievable content in local SLS database 106 to terminate a call to a second line number, render associated data and provide services uniquely associated with the second line number such as, but not limited to, dedicated voicemail, ringtones, caller ID, automated responses, etc.

Figure 2:
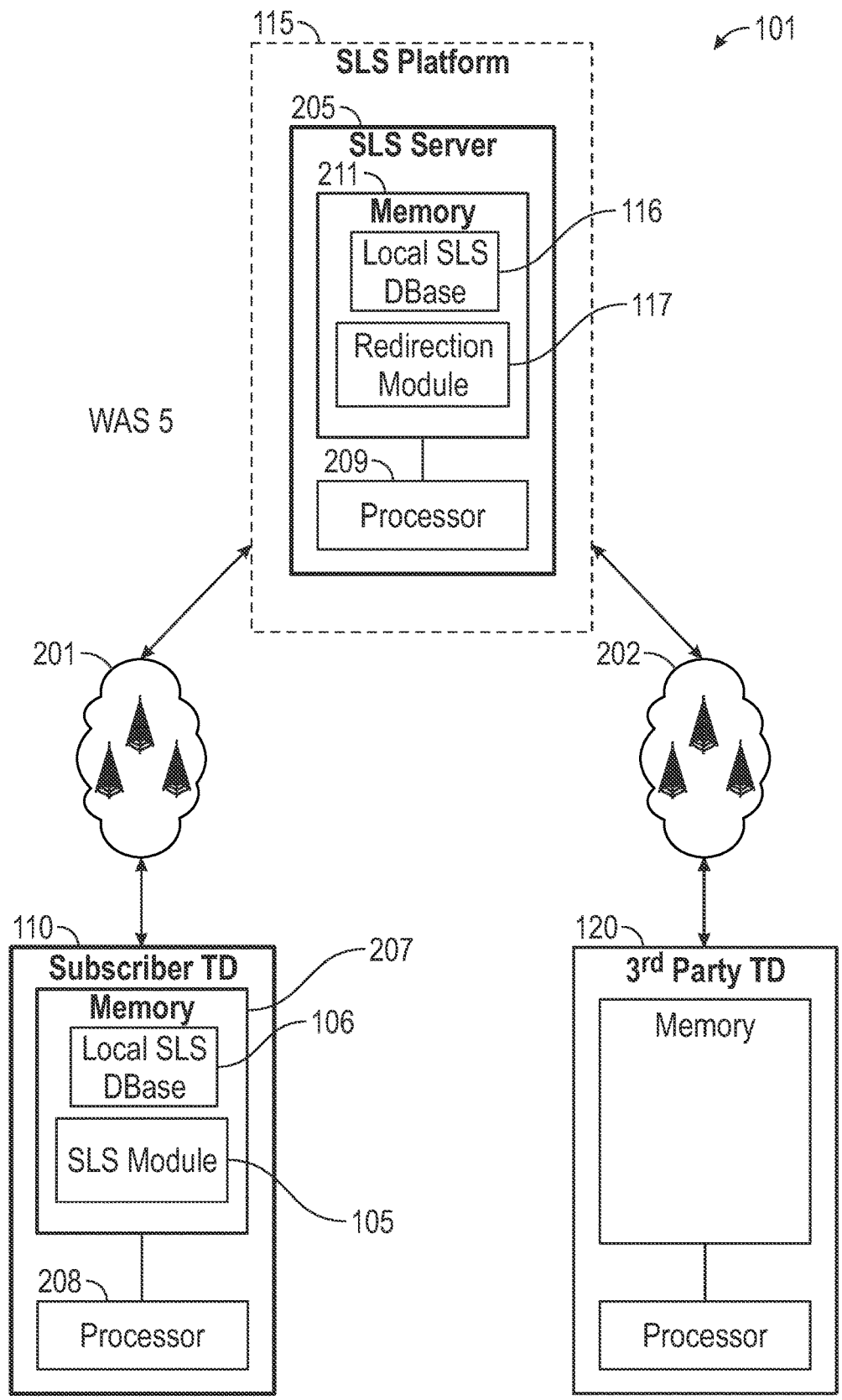
FIG. 2 a diagram of exemplary computer architecture 101 for the system 100 of FIG. 1 is depicted.

Referring to FIG. 2, a diagram of exemplary computer architecture 101 for the system 100 of FIG. 1 is depicted. The exemplary architecture 101 may include a subscriber telecommunications device ("TD") 110 and a third-party TD 120. An SLS platform 115 may be connected to the subscriber TD 110 via a first provider network 201 and to the third-party TD 120 via a second provider network 202, although it is envisioned that TDs 110 and 120 may be associated with a common service provider. The SLS platform 115 may include an SLS server 205 configured to receive calls directed to and from a second line number associated with subscriber TD 110.

As illustrated in FIG. 2, the SLS server 205 includes a processor 209 and a memory 211 coupled to the processor 209. The memory 211 may include instructions for executing one or more of the method steps described herein. Further, the processor 209 and the memory 211 may serve as a means for executing one or more of the method steps described herein. As indicated, the memory 211 may also include a redirection module 117 and a central SLS database 116. Notably, it should be understood that the term server 205 may refer to a single server system or multiple systems or multiple servers either co-located or dispersed and connected by means of a network. One of ordinary skill in the art will appreciate that the various server arrangements may be selected depending upon computer architecture design constraints and without departing from the scope of the invention.

As further illustrated in FIG. 2, the subscriber TD 110 may include a processor 208 and a memory 207 coupled to the processor 208. The memory 207 may include instructions for executing one or more of the method steps described herein. Further, the processor 208 and the memory 207 may serve as a means for executing one or more of the method steps described herein. As indicated, the memory 207 may also include an SLS module 105 and a local SLS database 106.

A more detailed description of the exemplary method, including exemplary methods for receiving a call from a third-party TD 120 and making a call to a third-party TD 120 by way of the SLS platform 115 as well as details to implement various embodiments is presented in greater detail in U.S. Pat. No. 9,332,408, which is herein above incorporated by reference.

In the environment illustrated and described in FIG. 1 and FIG. 2, an embodiment of the present invention can be utilized for gathering, analyzing and processing of user feedback, specifically as pertaining to service quality in the illustrated telecommunications system, and the automatic generation of reports and remedial measures in response to such user feedback.

Deployed within the afore-presented environments, embodiments provide a technique to receive real-time, consistent, and accurate feedback data from a service provider's user base. In addition, the various embodiments provide a solution for processing the feedback data to accurately identify the quality of service as is perceived by the user. Finally, the various embodiments include solutions for taking actions and making adjustments to the system in accordance with the feedback received.

Figure 3:
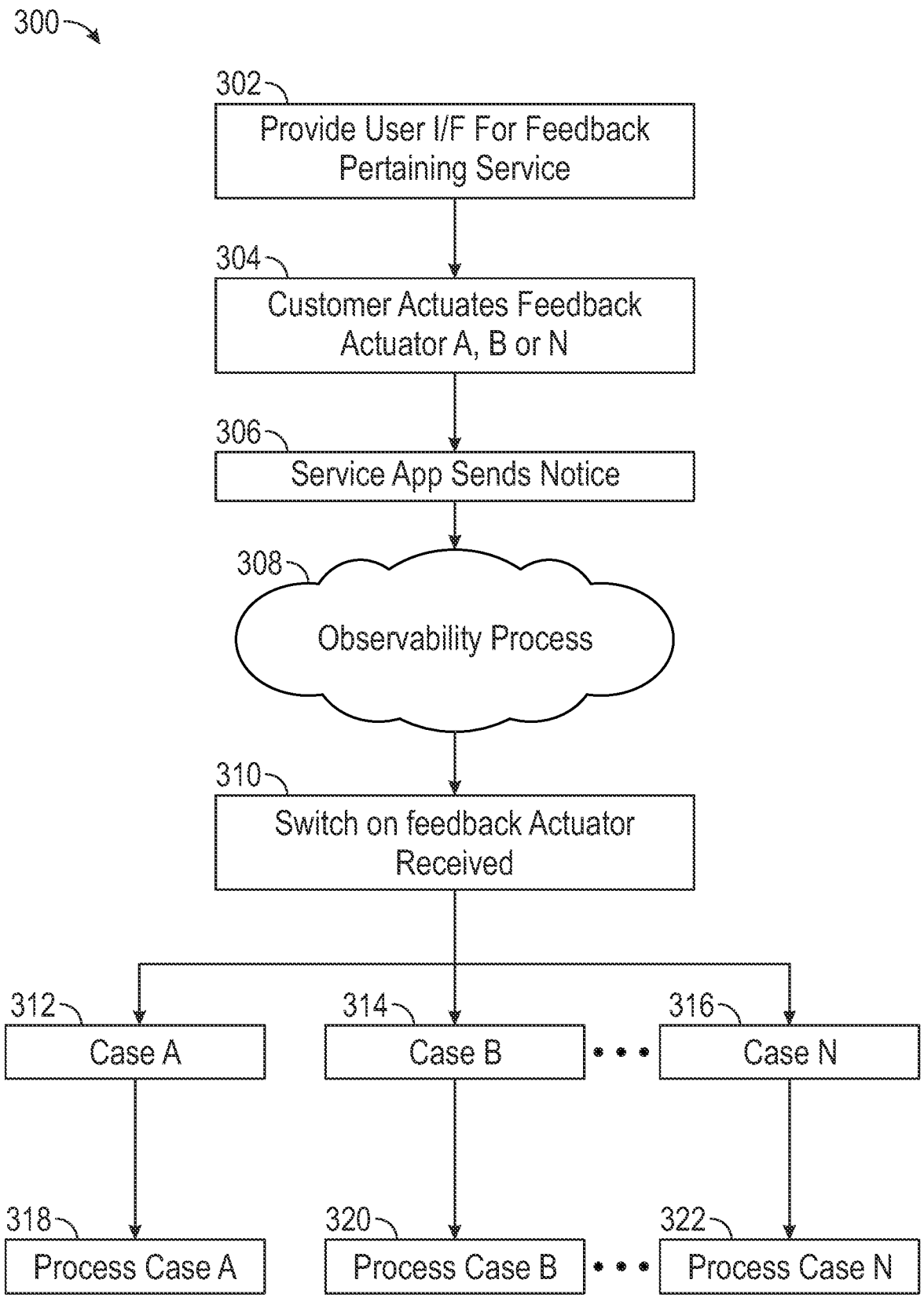
FIG. 3 is a functional flow diagram illustrating the operation of an exemplary embodiment the ARYA.

FIG. 3 is a functional flow diagram illustrating the operation of an exemplary embodiment the ARYA. In general, the service provided to the users should include at least a rudimentary user interface that can prompt the user and receive feedback from the user. The complexity of the user interface may vary from across the embodiments but in general, the exemplary user interface includes a way to prompt the user to take an action and then to detect and receive and understand the action taken by the user.

The functional flow 300 of an exemplary ARYA initially begins with the ARYA providing either a prompt or some user interface capability to accept or solicit user feedback pertaining to the service 302. The user interface 302 may be provided at the time that the user utilizes the service, while the user is engaged in the service, or just finishes using the service. These types of user interface prompts occur in real-time and are referred to herein as "notifications" or notification prompts. In essence, in some embodiments, the notification prompts can be presented as a banner on a user interface display, such as a mobile telephone screen. In other embodiments, the notification prompt may be delivered by text, SMS, email or other notification (i.e., pull down notifications on typical IOS and Android devices). Another category of user interface prompts include an interface that allow the users to provide feedback at a later time. This type of user interface is referred to as "recents". Recents user interface mechanisms can be sent via text or email, but more commonly may be presented or made available in interfaces such as activity logs, history, etc.

Regardless of the type of user interface provided for feedback 302, at some point a user of customer will actuate the feedback interface 304. In the illustrated function flow, the user may actuate actuator A, B or N 304. Once the user interface is actuated, the service app, or the application or system operating on the user equipment, will receive or detect the actuation of the user interface and provide notice of the same to the observability process 308. The observability process 308 may be a server that receives the information or it may be a server process running on a system. The process may be embedded within the service providing system or process or it may be a stand-alone system that is communicatively coupled to the service provider system and/or the user devices to receive feedback and provide prompts. The notification can be sent as an SMS, email, text, data channel communication, voice channel communication, bluetooth, wifi or any other technique to convey information from the user device to ARYA backend system. Once the observability process receives the feedback, the system will analyze the feedback, categorize the feedback and then take various actions depending on what the feedback information is determined to be 310. For Case A 312, the system will process case A feedback 318. For Case B 314, the system will process case B feedback. For Case N, the system will process case N feedback. The operations presented in flow blocks 302, 304 and 306 can best be understood by looking at the examples provided in FIG. 4 and FIG. 5.

Figure 4A:
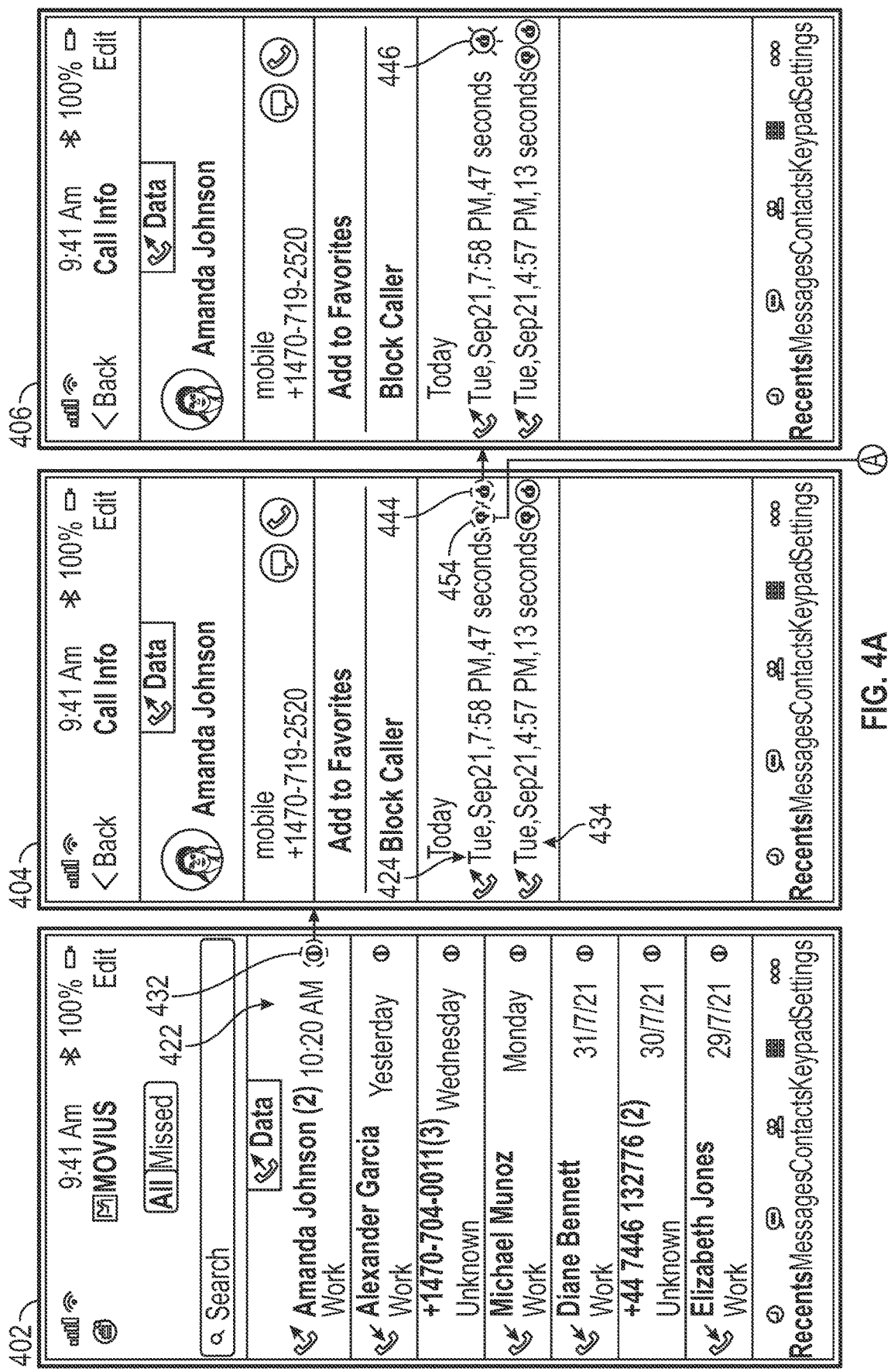
FIG. 4A is a flow diagram illustrating a portion of one exemplary embodiment of a recents notification interface.
Figure 4B:
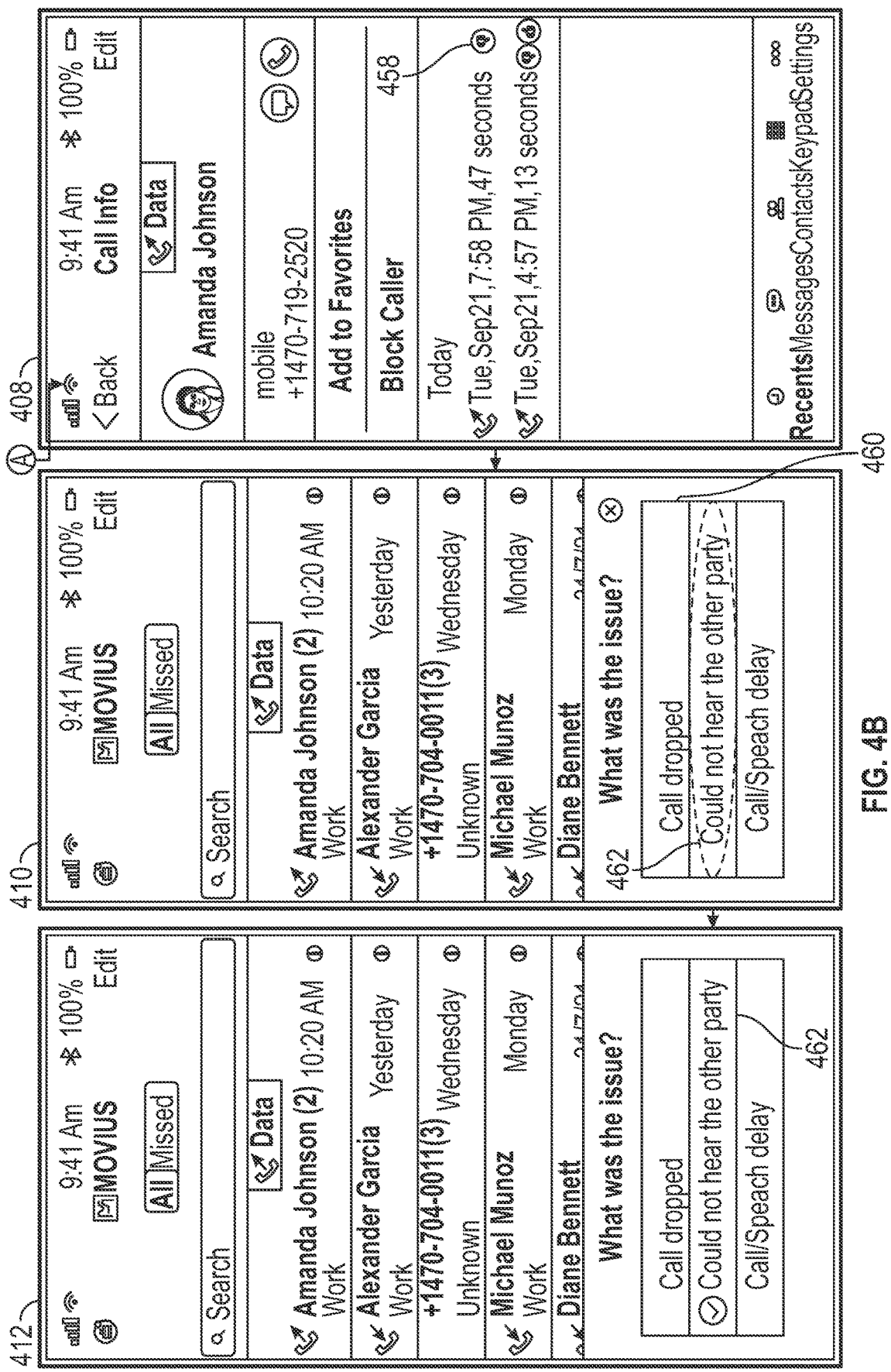
FIG. 4B is a flow diagram illustrating further portions of the exemplary embodiment of a recents notification interface.

FIG. 4A is a flow diagram illustrating a portion of one exemplary embodiment of a recents notification interface. FIG. 4B is a flow diagram further illustrating portions of the exemplary embodiment of a recents notification interface. Looking first at FIG. 4A, screen 402 illustrates a call log 422 showing incoming and outgoing calls, the party that the call was received from or directed to, and the date the call was received or made. In addition, each entry in the call log 422 includes an actuator 432. In the illustrated embodiment, the actuator 432 is shown as a blue lower case "i" inside a blue circle. The red circle is provide to help identify the actuator that is being acted upon. In this case, feedback is being provided for a call that was placed to Amanda Johnson. In response to actuating the actuator 432, the user interface transitions to the next screen, the call info screen 404.

In the call info screen 404, further details are provided and additional user interface actuators are presented. It can be seen that two calls were placed to Amanda Johnson, one at 7:58 PM on September 21 and one at 4:57 PM on September 21. For each of these entries, two actuators are provided: a thumbs up and a thumbs down. In the illustrated embodiment, the actuators for the 7:58 PM entry are circled in red indicating that user is going to actuate one of these items. If the user actuates the thumbs up icon 444, the user interface transitions to screen 406 where the feedback indicator 446 is high-lighted and a positive feedback message is provided to the ARYA system. At this point the user is finished and operation with the user device may continue as normal. For instance, the user can continue using the device or may provide feedback for another call or may even revise the feedback previously provided.

On the other hand, if the user actuates the thumbs down icon 454, indicating negative feedback, the user interface transactions to screen 408 (element A of FIG. 4B). In screen 408, a thumbs down icon 458 is shown to be high-lighted in red. The illustrated user interface is then shown to transition to screen 410 where the user is prompted to provide further information regarding the reason for the negative feedback. In the illustrated embodiment, the user is given the opportunity to select one more radial buttons indicating the reason for the negative feedback. In the illustrated menu 460, the user can select one or more of the radial buttons associated with the text "Call dropped", "could not hear the other party" and/or "call/Speech delay". In the illustrated embodiment, the radial associated with the text "Could not hear the other party" 462 is circled in red to indicate that the user is selecting that feedback. The user interface then transitions to screen 412 where the radial 462 is shown as being selected and a negative feedback message is provided to the ARYA system. At this point the user is finished and operation with the user device may continue as normal. For instance, the user can continue using the device or may provide feedback for another call or may even revise the feedback previously provided.

It should be appreciated that the illustrated non-limiting example could provide more granularity for feedback such as ranking the quality from 1 to 10, providing further positive and/or negative feedback categories, etc. Further, in some embodiments, the icon, such as icon 432 may disappear or change appearances to show that feedback has already been provided for this entry.

Figure 5A:
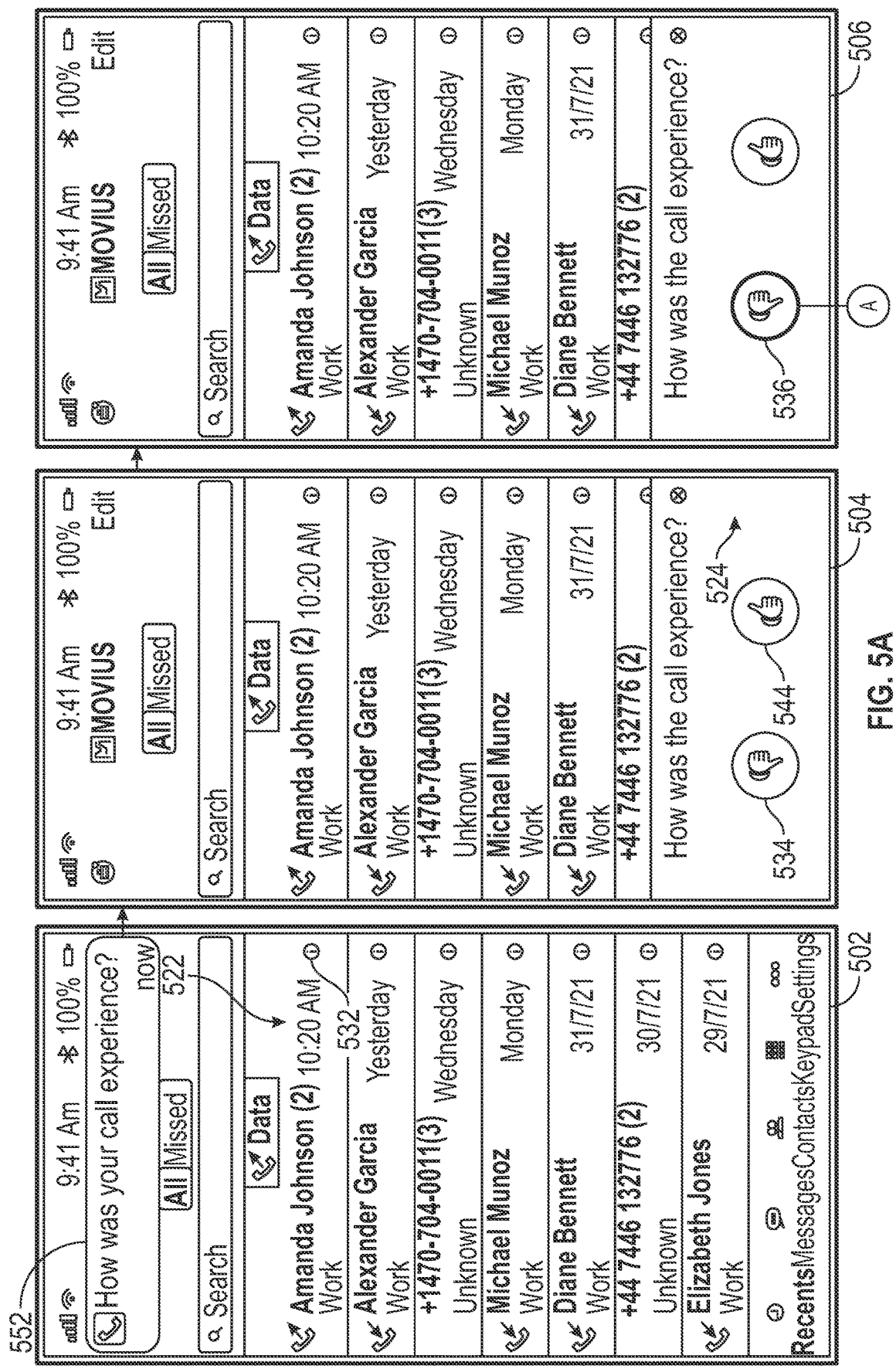
FIG. 5A is a flow diagram illustrating a portion of one exemplary embodiment of a notifications user interface.
Figure 5B:
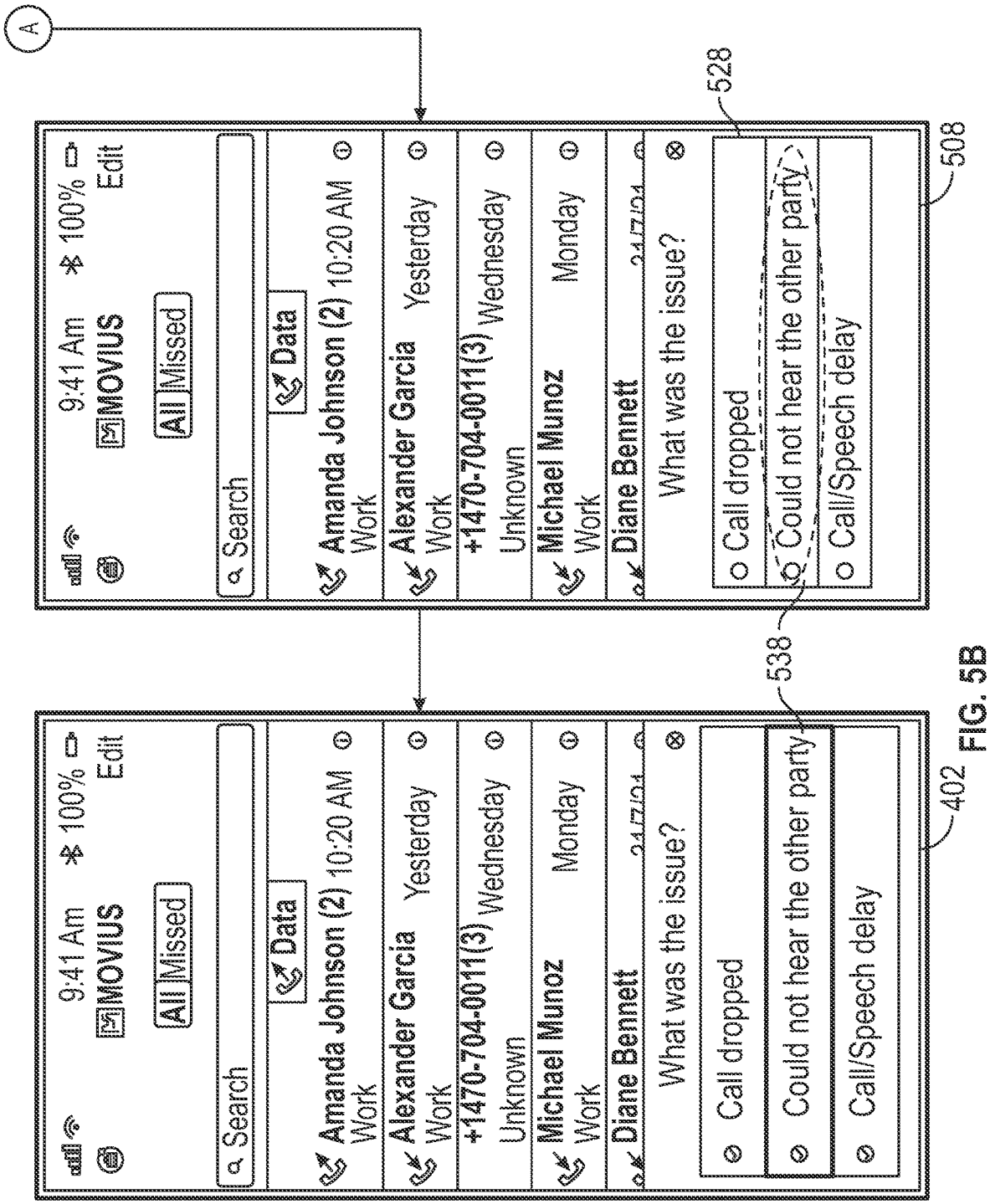
FIG. 5B is a flow diagram illustrating further portions of the exemplary embodiment of a notifications user interface.

FIG. 5A is a flow diagram illustrating a portion of one exemplary embodiment of a notifications user interface. FIG. 5B is a flow diagram illustrating further portions of the exemplary embodiment of a notifications user interface. Looking at FIG. 5A, screen 502 illustrates a call log 522 showing incoming and outgoing calls, the party that the call was received from or directed to, and the date the call was received or made. In addition, each entry in the call log 522 includes an actuator 532 similar to what was described in conjunction with FIG. 4 may be provided. In the illustrated embodiment, a notifications or pop-up actuator 552 is shown as a banner across the top of the screen. Such a banner may be provided during a service, such as a call or near the end or immediately following the termination of the service. Thus, the user feedback is requested prior to or without the user having to enter into the call log. For instance, although the call log 522 is illustrated in screen 502, the pop-up notifications banner 552 could be displayed on any available user screen.

If the user actuates the notifications pop-up 552, the user interface transitions to screen 504. In screen 504, a window 524 is opened for the user to actuate any displayed actuators. In the illustrated example, two actuators are displayed, a thumbs down actuator 534 and a thumbs up actuator 544.

If the user actuates the thumbs up actuator 544, a positive feedback message can be sent to the ARYA.

On the other hand, if the user actuates the thumbs down icon 534, indicating negative feedback, the user interface transactions to screen 508 (element A of FIG. 5B). In screen 508, the thumbs down icon 536 is shown to be high-lighted in red. The illustrated user interface is then shown to transition to screen 508 where the user is prompted to provide further information regarding the reason for the negative feedback. In the illustrated embodiment, the user is given the opportunity to select one more radial buttons indicating the reason for the negative feedback. In the illustrated menu 528, the user can select one or more of the radial buttons associated with the text "Call dropped", "could not hear the other party" and/or "call/Speech delay". In the illustrated embodiment, the radial associated with the text "Could not hear the other party" 538 is circled in red to indicate that the user is selecting that feedback. The user interface then transitions to screen 510 where the radial 538 is shown as being selected and a negative feedback message is provided to the ARYA system. At this point the user is finished and operation with the user device may continue as normal. For instance, the user can continue using the device or may provide feedback for another call or may even revise the feedback previously provided.

It should be appreciated that the illustrated non-limiting example could provide more granularity for feedback such as ranking the quality from 1 to 10, providing further positive and/or negative feedback categories, etc. Further, in some embodiments, a subsequent entry into a log may change appearances to show that feedback has already been provided for this entry.

Figure 6:
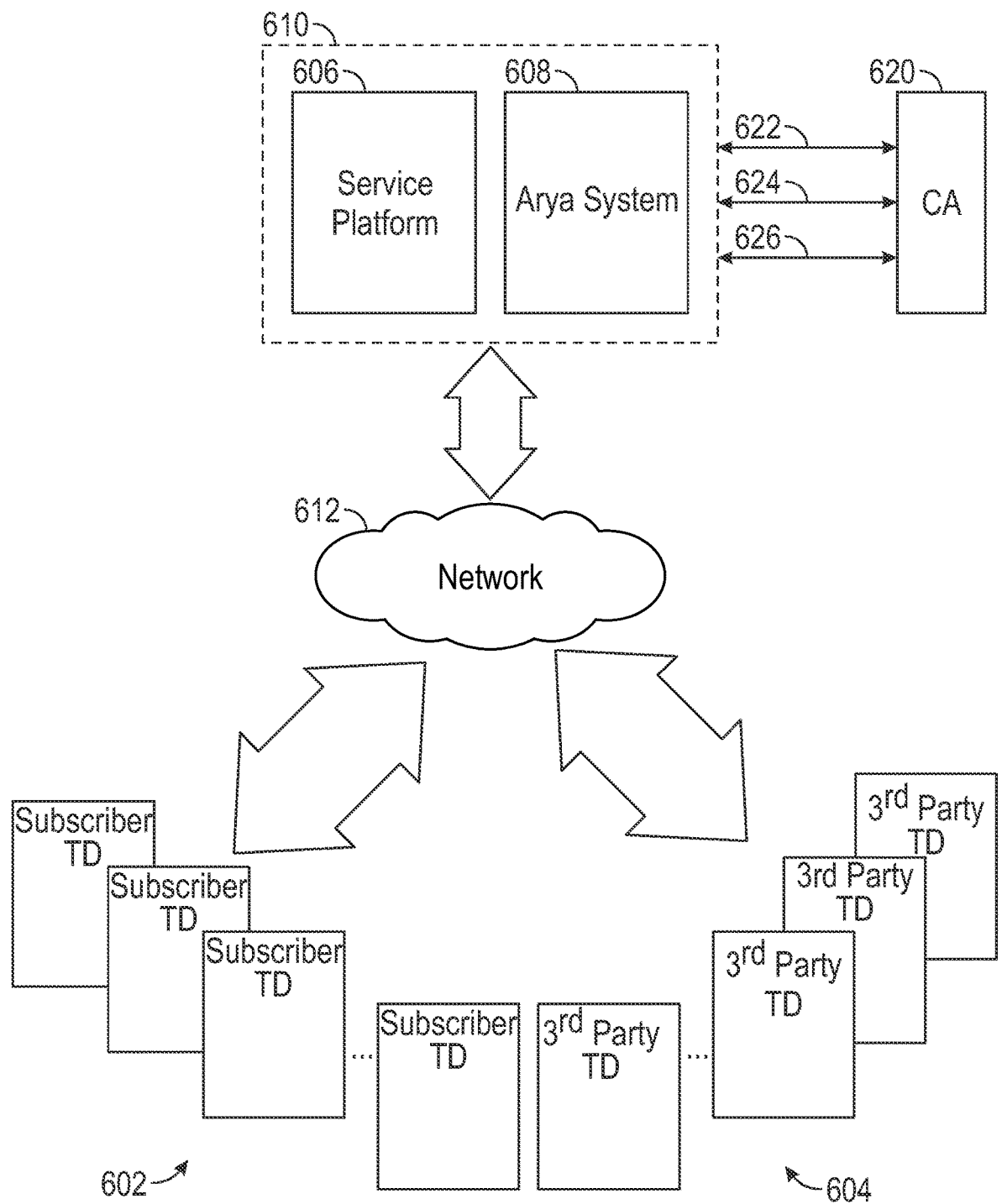
FIG. 6 is a functional block diagram illustrating overall operation of an exemplary embodiment of the ARYA.

FIG. 6 is a functional block diagram illustrating overall operation of an exemplary embodiment of the ARYA. The illustrated environment includes a plurality of subscriber terminal devices ("TD") 602 and a plurality of third-party TDs 604, any of which may be involved in any particular presentment of the service. For instance, a call between a subscriber TD and a third-party TD, twos subscriber TDs, a conference call including multiple subscriber TDs and third-party TDs, etc.

The service is provided from a service platform 606. The ARYA backend system 608 is used to interface with the service platform and the various TDs to solicit and obtain feedback, as well as process and trigger any actions as may be necessary. The ARYA backend system 608 may be integrated with the service platform 606, or they may both reside in a common system 610, or they may be connected via a local or wide area network or even in some cases, they may not even be connected whatsoever. All that is really required is that the ARYA backend 608 is able to receive the feedback from the various TDs and the various TDs must receive and send the feedback. Thus, this could go through the service platform 606 or go directly to the ARYS system 608. In the illustrated embodiment the ARYA backend 608 is connected or communicatively coupled to the various TDs through a network 612, either through the service platform 606 or separate from the service platform 606.

As feedback is received with regards to the service, the feedback is provided to a customer admin system and/or operator 620. The feedback provided preferably includes information about the service, the time of day, the types of equipment involved and any other information useful for ascertaining important parameters about the service activity being reported.

Information can be provided to the customer admin 620 in several manners. One technique is for the ARYA backend system 608 to provide a call quality report, such as providing the information in a comma separated values file that is sent via SFTP 622. In an exemplary embodiment, the CSV file with predefined fields can be retrieved daily or periodically from the SFTP server. The CSV file may contain records of all the cases which are in the open state and the ones which are closed on that day. The CSV file can be used by the customer to ingest data into a third-party reporting tool for deeper analysis. Preferably, utilizing this technique, the user or customer would provide a secure SFTP server.

Information may also be provided to the customer admin 620 by means of a call quality ticket management 624. In this technique, each negative feedback issue results in the creating and opening of a Salesforce Case, which is then updated with the RCA of the issue reported. The RCA can be updated in the cases and then the case can be closed by the customer admin system 620 or as a result of the service provider giving an indication to the customer admin 620 that the issue has been resolved.

Information may also be provided to the customer admin 620 through the emailing of a call quality summary report 626. The call quality summary report can be sent daily or periodically to the assigned email address associated with the customer admin 620. Typically, the report would contain feedback received over a period of time (i.e., the last 30 days) as well as feedback received in the last shorter period of time (i.e. the last 24 hours).

The customer admin 620 can apply the use of artificial intelligence to analyze all of the received information and identify remedial measures to be taken. One of the remedial measures includes the generation of service quality reports, such a call quality reports for the MLS example.

Figure 7A:
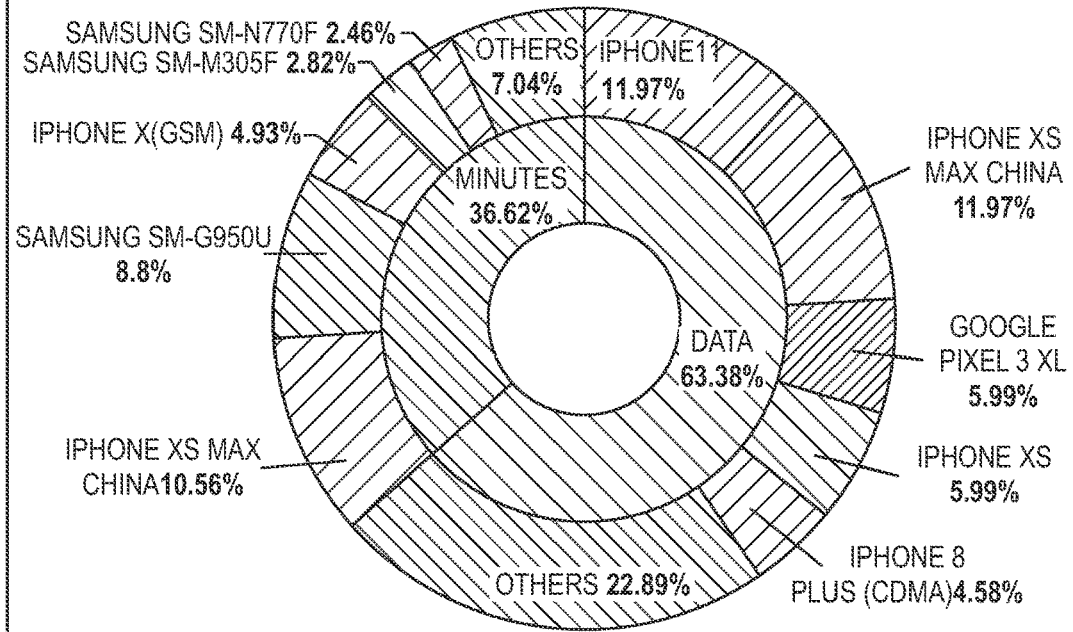
FIG. 7A illustrates a portion of a quality report illustrating feedback received for a service over a prolonged period, such as 30 days in the illustrated non-limiting example.
Figure 7B:
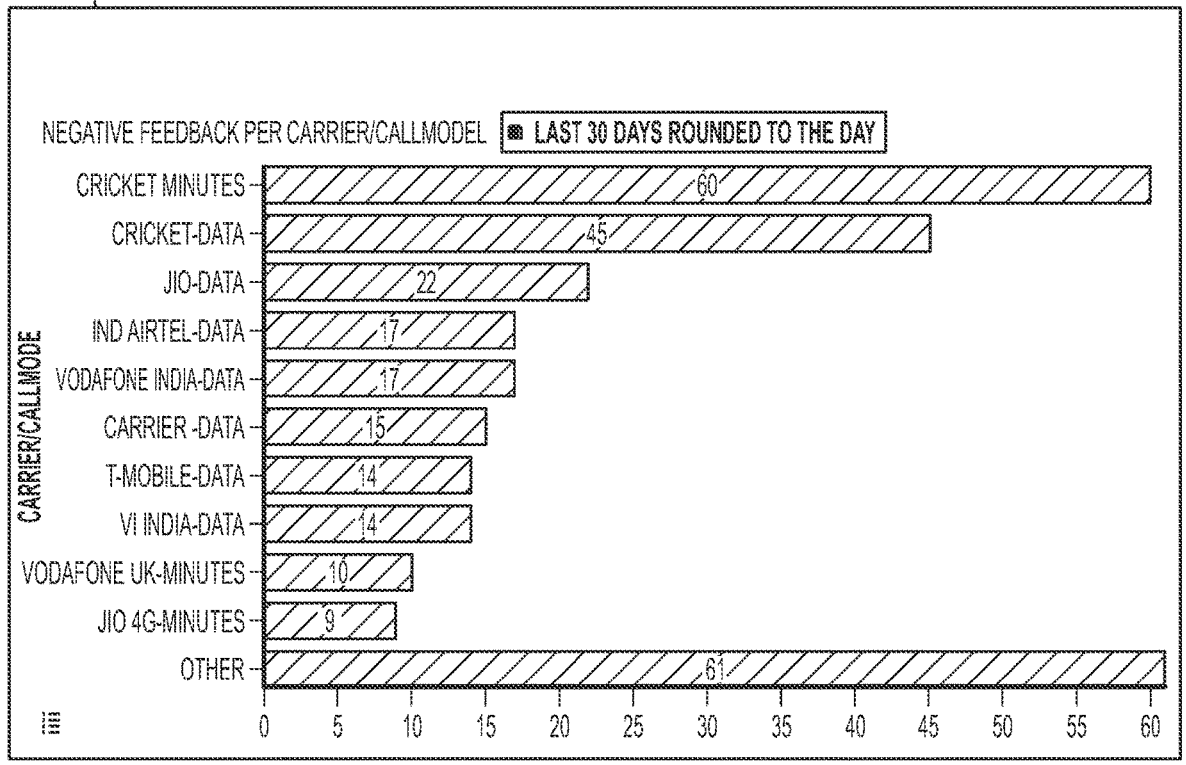
FIG. 7B illustrates a further portion of a quality report illustrating feedback received for a service over a prolonged period, such as 30 days in the illustrated non-limiting example.
Figure 7B:
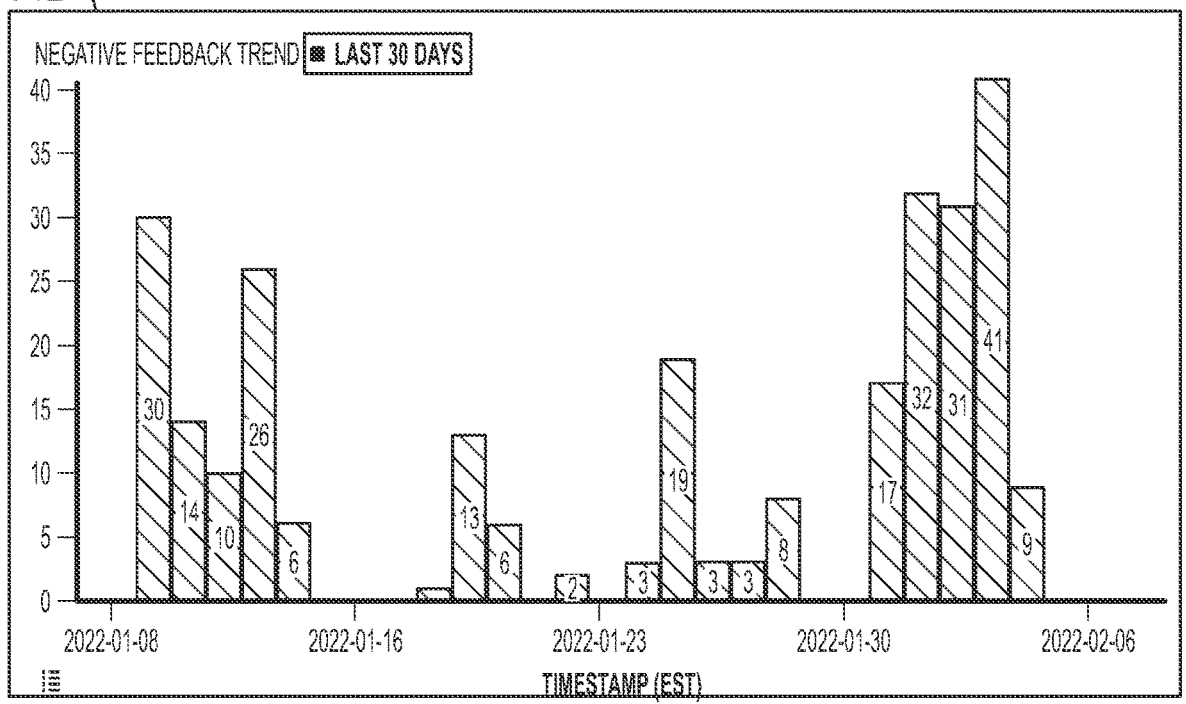
Figure 7C:
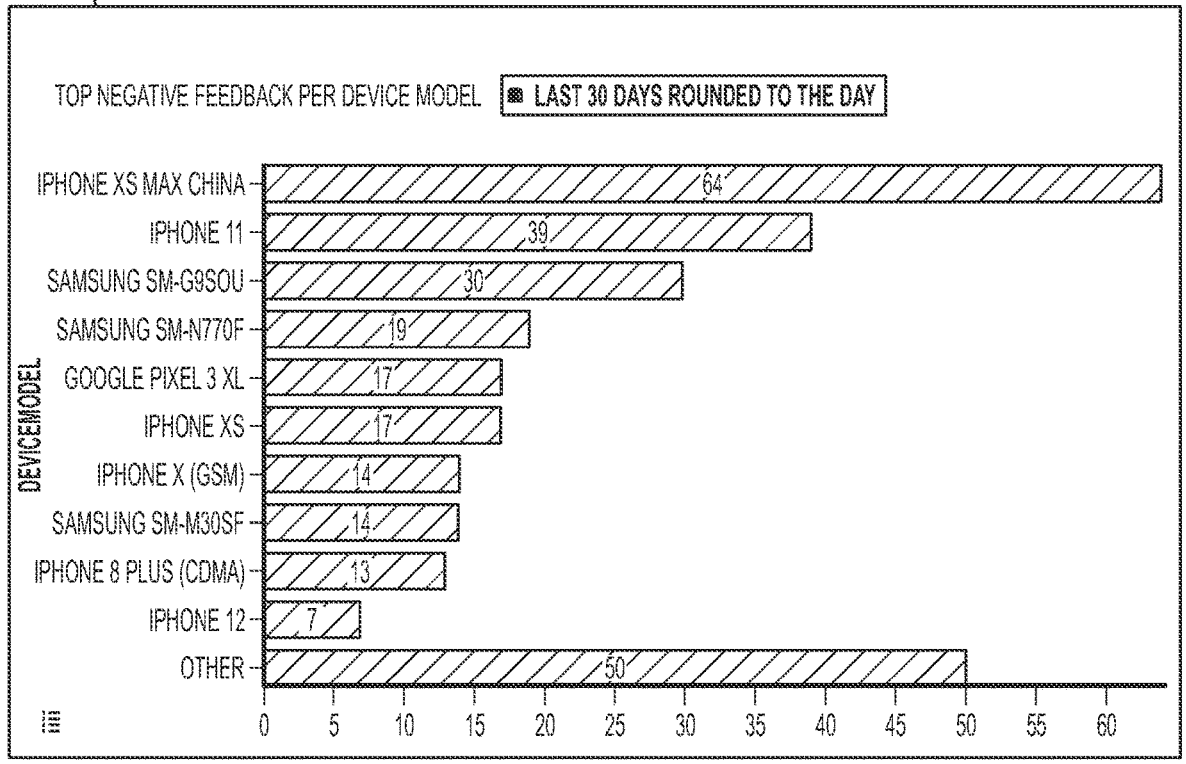
FIG. 7C illustrates a further portion of the quality report illustrating feedback received for a service over a prolonged period, such as 30 days in the illustrated non-limiting example.
Figure 7C:
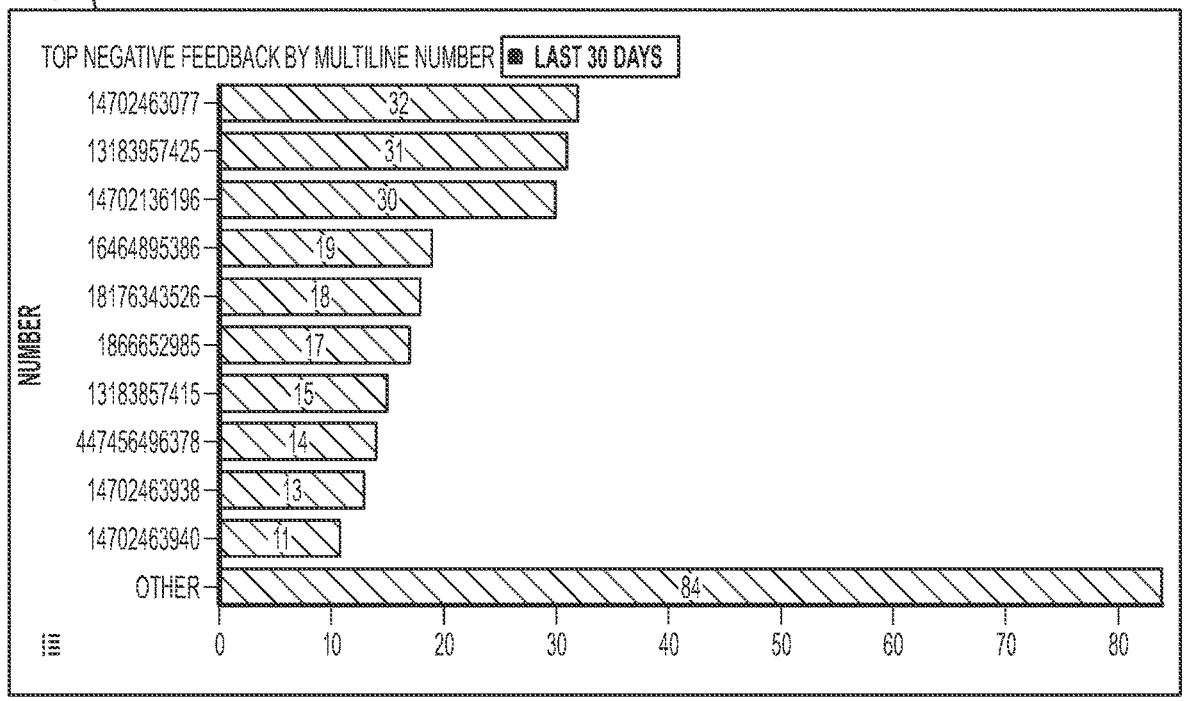

FIG. 7A, FIG. 7B and FIG. 7C illustrate a quality report illustrating feedback received for a service over a prolonged period, such as 30 days in the illustrated non-limiting example. Starting with FIG. 7A, the illustrated report 700 shows a first information panel 702 that presents the period of time that the report covers, the total times the service was provided during the period, which in the illustrated case is 1,085,415 (i.e., calls) and the number of negative feedback reports received during that period. A next panel 704 provides a bar chart showing the amount of negative feedback received along with the amount of RCA provided and the RCA that is pending. Panel 706 provides a bar chart showing the categories of negative feedback that the reports fall into (i.e, call dropped, could not hear the other party, call/speech delay, not specified). Panel 708 presents a pie chart showing a breakdown of the negative feedback. In the illustrated multi-line service embodiment, an inner pie chart shows the negative feedback of the multi-line service calls that were provided using regular voice call minutes versus the calls that utilized data only. Further, the outer pie chart illustrated the type of TD's utilized in the respective call types. Advantageously, it can thus be ascertained what type of service and TD resulted in the most problems and the least problems.

Turning to FIG. 7B, panel 710 illustrates the breakdown of the negative feedback based on the carrier and/or call mode of the particular calls. Further, the customer admin 620 can conduct a comparison and analysis of all the data received and prepare a bar chart such as the one illustrated in panel 712. The chart in panel 712 illustrates the negative feedback trending over time. In FIG. 7C, panel 714 illustrates top negative feedback for each device model over the period of time. Panel 716 illustrates the top negative feedback for specific multiline service numbers.

Figure 8A:
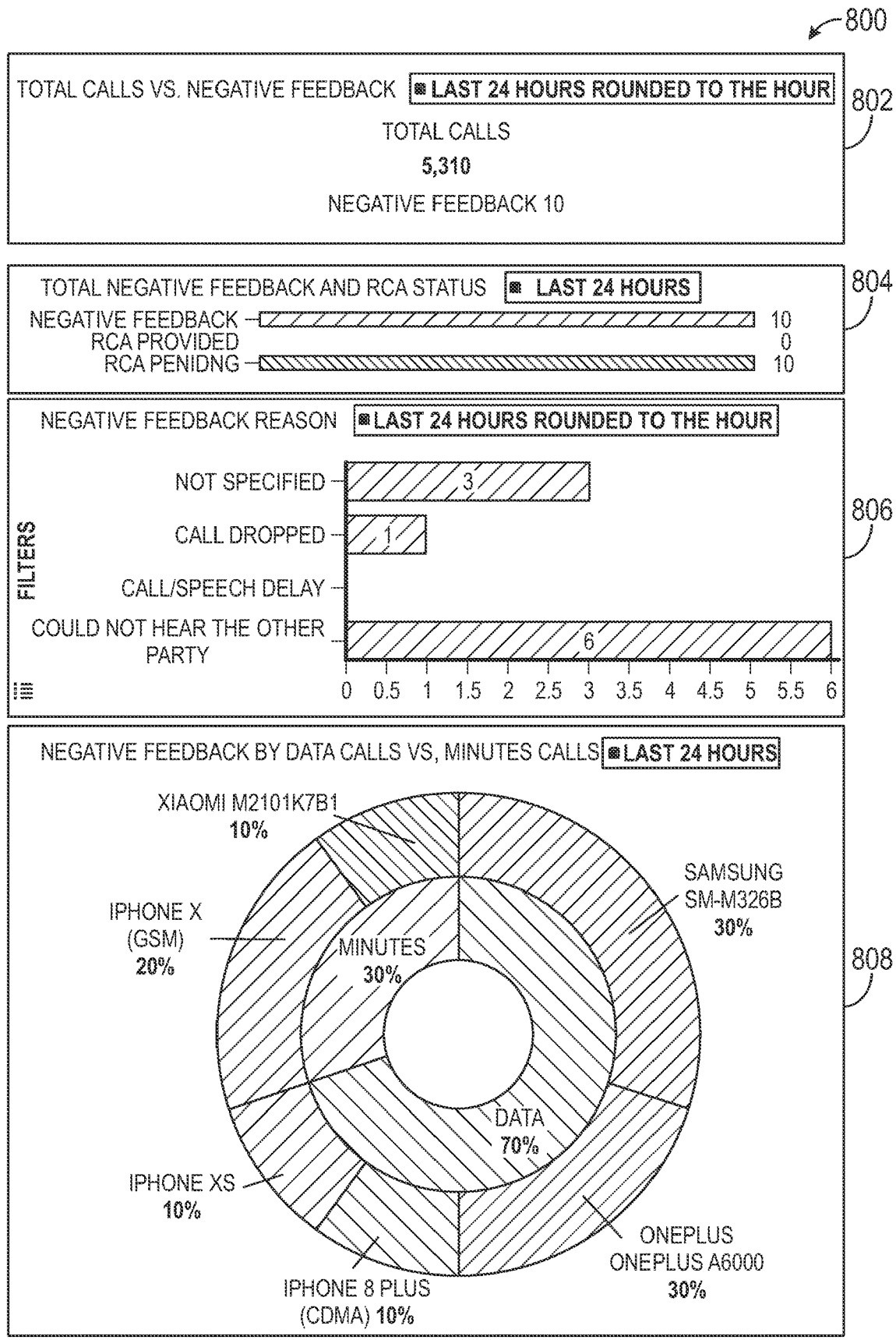
FIG. 8A illustrates portions of a quality report illustrating feedback received for a service over a short or immediate period, such the last 24 hours in the illustrated non-limiting example.
Figure 8B:
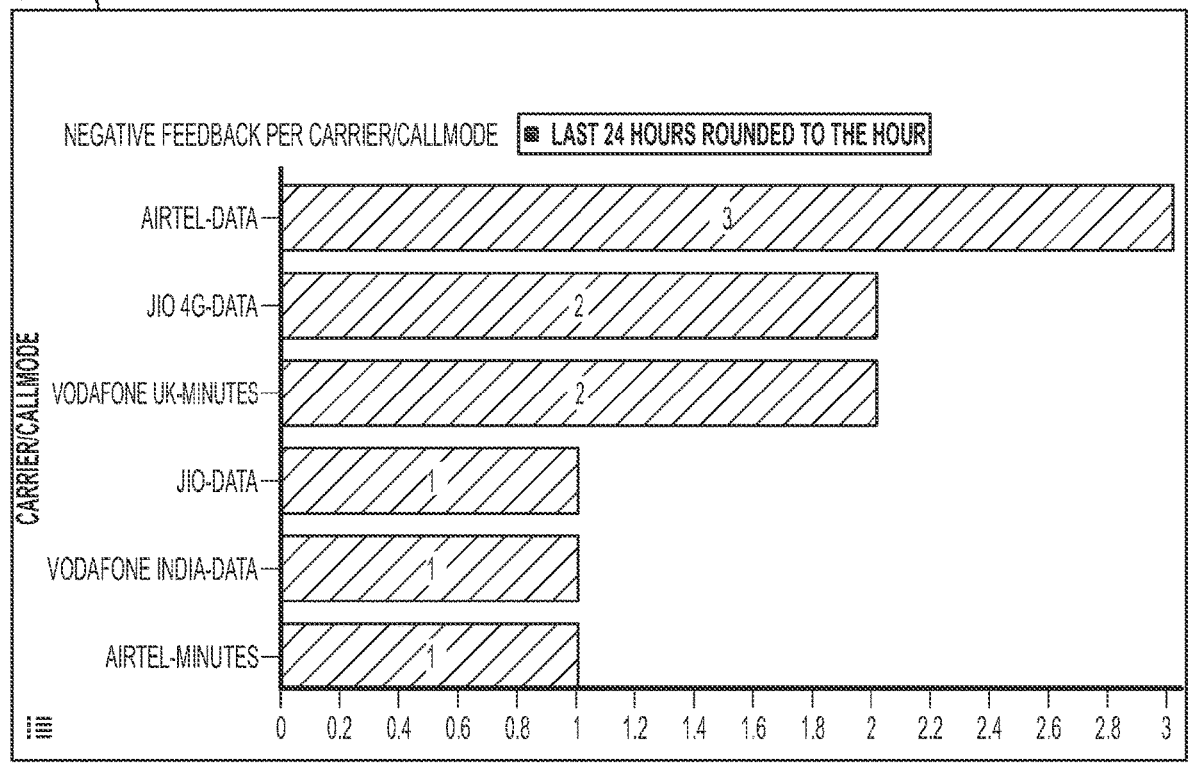
FIG. 8B illustrates further portions of the quality report illustrating feedback received for a service over a short or immediate period, such the last 24 hours in the illustrated non-limiting example.
Figure 8B:
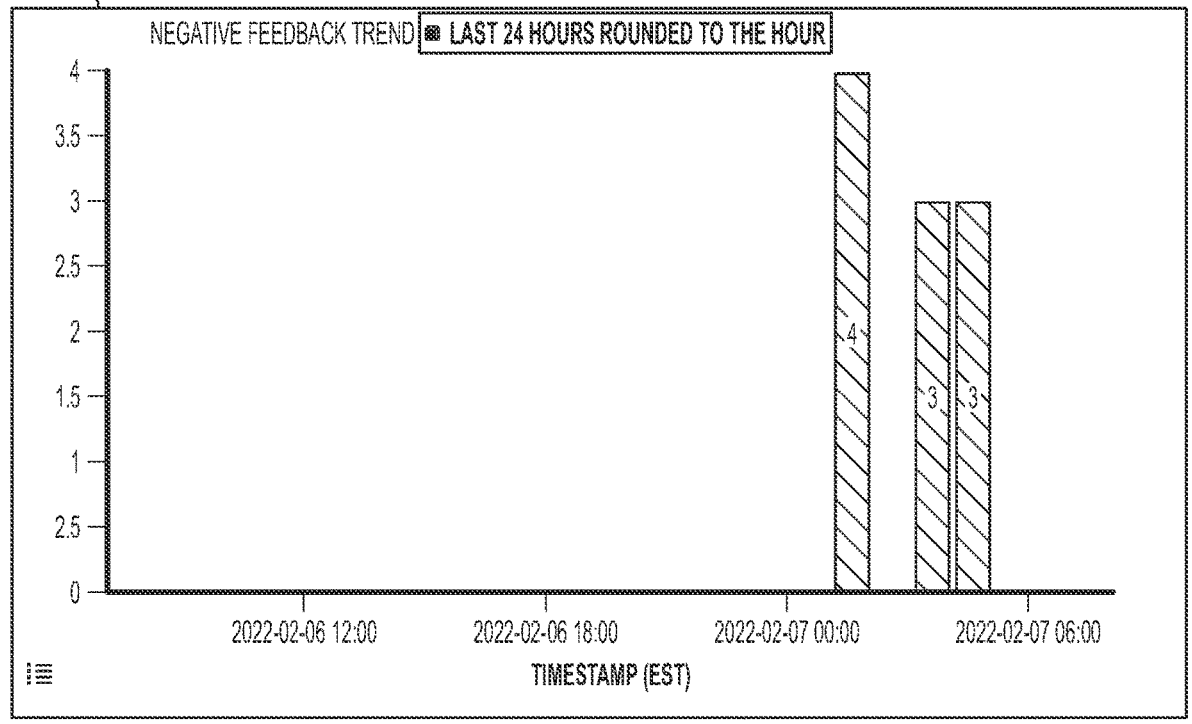
Figure 8C:
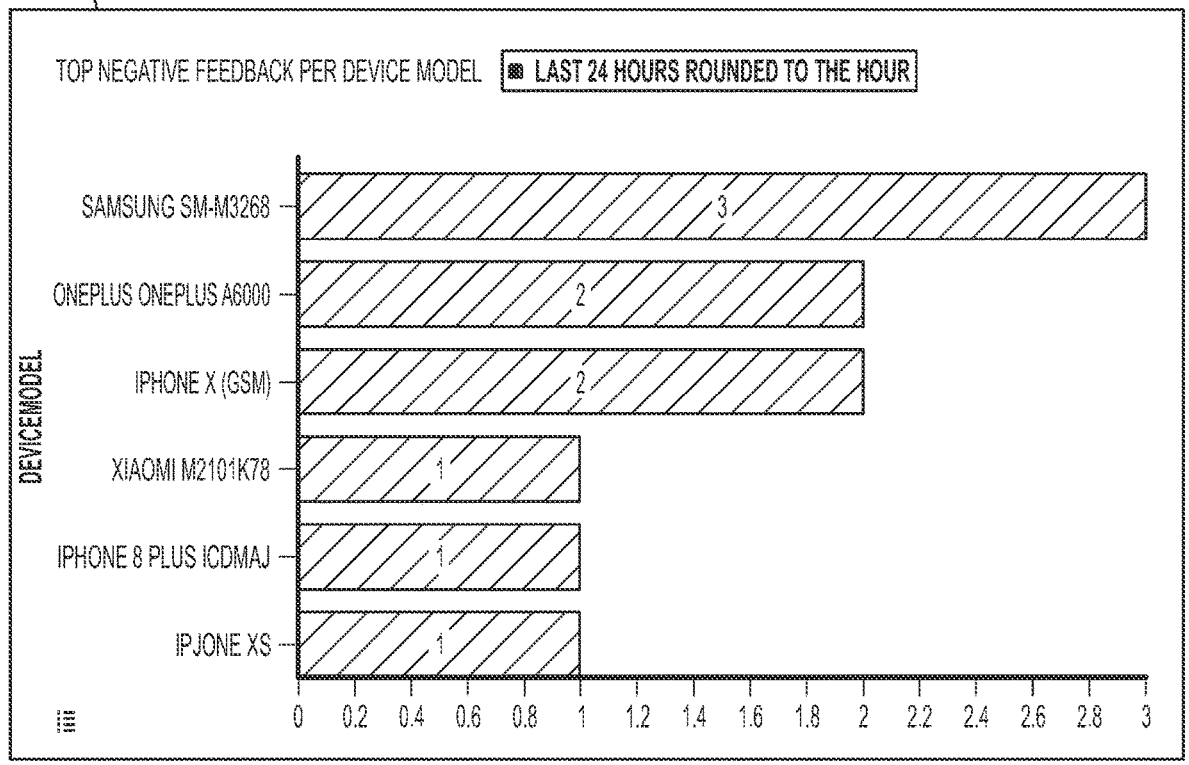
FIG. 8C illustrates even further portions of the quality report illustrating feedback received for a service over a short or immediate period, such the last 24 hours in the illustrated non-limiting example.
Figure 8C:
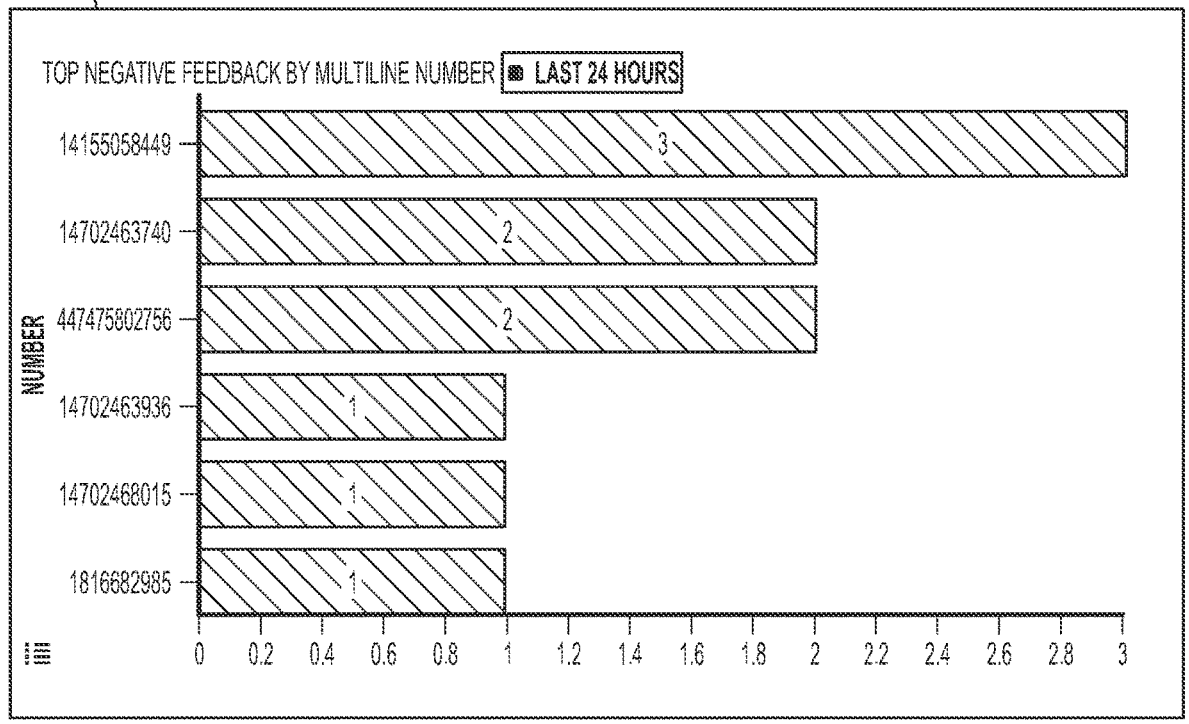

FIG. 8A, FIG. 8B and FIG. 8C illustrate a quality report illustrating feedback received for a service over a short or immediate period, such the last 24 hours in the illustrated non-limiting example. Looking first at FIG. 8A, the illustrated report 800 shows a first information panel 802 that presents the period of time that the report covers, the total times the service was provided during the period, which in the illustrated case is 5310 (i.e., calls) and the number of negative feedback reports received during that period. A next panel 804 provides a bar chart showing the amount of negative feedback received along with the amount of RCA provided and the RCA that is pending. Panel 806 provides a bar chart showing the categories of negative feedback that the reports fall into. Panel 808 presents a pie chart showing a breakdown of the negative feedback. In the illustrated multi-line service embodiment, an inner pie chart shows the negative feedback of the multi-line service calls that were provided using regular voice call minutes versus the calls that utilized data only. Further, the outer pie chart illustrated the type of TD's utilized in the respective call types. Advantageously, it can thus be ascertained what type of service and TD resulted in the most problems and the least problems.

Turning to FIG. 8B, panel 810 illustrates the breakdown of the negative feedback based on the carrier and/or call mode of the particular calls. Further, the customer admin 620 can conduct a comparison and analysis of all the data received and prepare a bar chart such as the one illustrated in panel 812. The chart in panel 812 illustrates the negative feedback trending over time. In FIG. 8C panel 814 illustrates top negative feedback for each device model over the period of time. Panel 816 illustrates the top negative feedback for specific multiline service numbers.

This information can thus be used to trigger remedial actions, such as instructing the engineering department to analyze why a certain model of device and/or operating system tends to have a higher incident of errors than other models, or performance degradation on minute based calls rather than data calls, etc.

As a non-limiting example, looking at FIGS. 7A, 7B, 7C, 8A, 8B and 8C, it is apparent that most of the negative feedback is related to calls over data as opposed to minutes. This can further be broken down based on time and date to see if there is a bandwidth issue during a particular period of time. Such an automated analysis can be used to adjust the bandwidth allocated to the data channel for such period of times and thus, alleviate the issue and improve performance. Likewise, real-time and automated adjustments can be made to the bandwidth of the minutes channels, the power thresholds for handoffs, retry attempts on certain devices that are experiencing higher data errors (ie., Samsung SM-M326B in FIG. 8A. Further if certain carriers are resulting in a higher amount of negative feedback, calls through those carriers may be routed to other networks while problem reports are being worked on and resolved. Likewise, if a particular model of device is experiencing a high level of error on one channel (i.e data or minutes) the system can be adjusted to force that model of device to utilize only the channel with best performance while problem tickets are created and addressed.

A negative report that does not appear to be tied to any particular model of device may be a system issue. Thus, in response to such feedback, changes can be automatically invoked or at least scheduled for the system. Such changes may include adding additional processing power to a particular portion of the network, or increasing the bandwidth (either data or voice or both) of a particular geographic area within a telecommunications system, or routing a portion of the traffic through other parts of the network. Likewise, positive feedback may be used to identify resources that can be borrowed or capitalized on to alleviate areas that are receiving negative feedback. Thus, if a particular area of the network is receiving a high percentage of positive feedback, some traffic in areas that are experiencing negative feedback can be routed through that area or other resources from the positive feedback area may be utilized for the negative feedback areas.

For a service provider, such as a cellular carrier, embodiments of the ARYA can identify particular mobile device models, software versions, etc. that are associated with positive and negative feedback. In response to this information, the system can automatically adjust the advertisement and promotions to push the mobile devices that are experiencing positive feedback and push customers away from the mobile devices that are receiving negative feedback. The service providers may even provide push notifications to customers that have problematic mobile devices and encourage them to update the software if they are using a version that is associated with the negative feedback, or provide trade-in special offers to the customers in an attempt to move them to a different mobile device.

If a negative feedback trend is detected, especially for a particular cell tower, traffic can be routed through other cell towers while that particular cell tower is being examined and worked on to resolve the issue. Such trends can predict expected failures in cell tower equipment.

Figure 9:
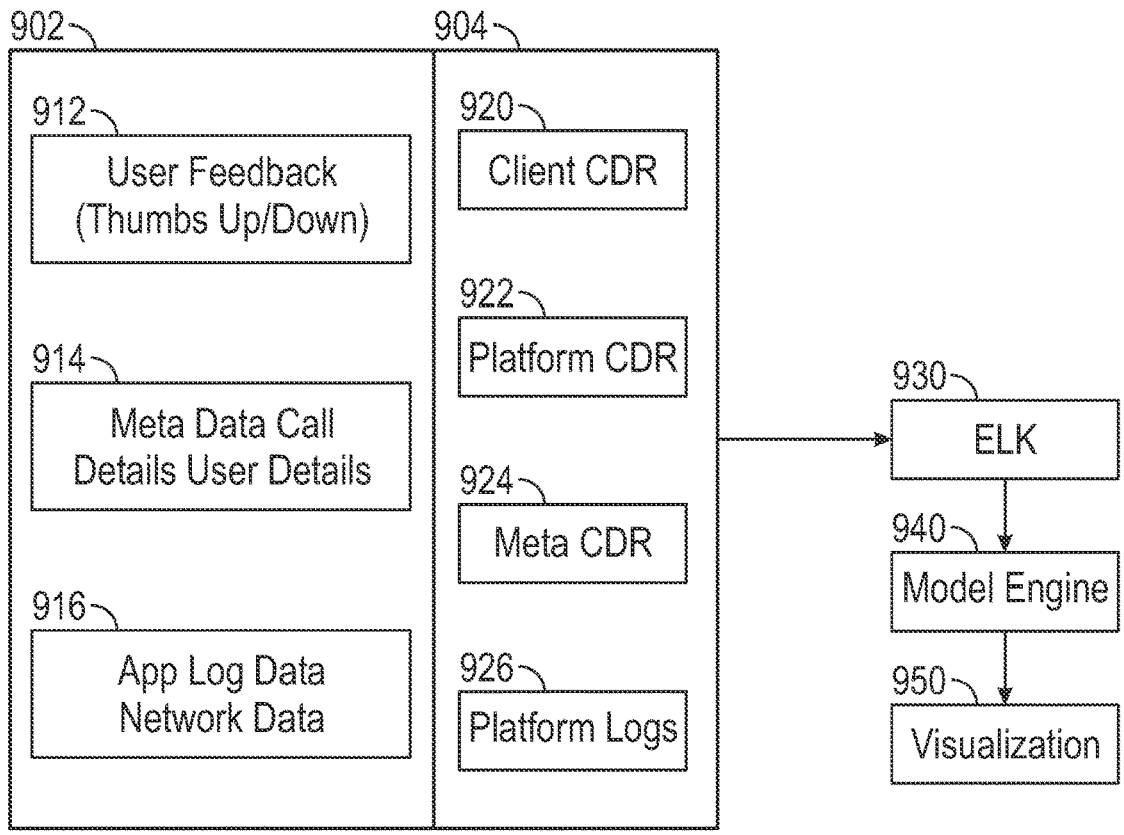
FIG. 9 is a block diagram illustrating the operation of condition diagnosing and showing the flow of data to a model AI engine for processing the data.

FIG. 9 is a block diagram illustrating the operation of condition diagnosing and showing the flow of data to a model AI engine for processing the data. The raw information 902 input into the system includes user feedback data 912 (i.e., thumbs up and thumbs down indications as a non-limiting example), meta data pertaining to call details and user details 914 and application log data and network data 916.

FIG. 9 also illustrates the utilization of processed data 904. The illustrated non-limiting examples of processed data 904 includes client CDR 920, platform CDR 922, meta CDR 924 and platform LOGS 926. A CDR ("call data record") is a data record produced by a telephone exchange or other telecommunications equipment that documents the details of a telephone call or other telecommunications transactions (e.g., text message) that passes through that facility or device. The record contains various attributes of the call, such as time, duration, completion status, source number, and destination number.

A call detail record contains data fields that describe a specific instance of a telecommunication transaction but does not include the content of that transaction. As a non-limiting example, a CDR may describe a particular telecommunication event by including the phone numbers of both the calling and receiving parties, the start time, and duration of that call. In actual modern practice, call detail records are much more detailed. As a non-limiting example, CDRs may include any or all of the following fields: (a) the phone number of the subscriber originating the call (calling party, A-party) (b) the phone number receiving the call (called party, B-party); (c) the starting time of the call (date and time); (d) the call duration; (e) the billing phone number that is charged for the call; (f) the identification of the telephone exchange or equipment writing the record; (g) a unique sequence number identifying the record; (h) additional digits on the called number used to route or charge the call; (i) the disposition or the results of the call, indicating, for example, whether or not the call was connected; (j) the route by which the call entered the exchange; (k) the route by which the call left the exchange; (l) call type (voice, SMS, etc.); (m) voice call type (call setup, call continue, call operation, call end, call idle, call busy, out of service call); and (n) any fault condition encountered.

Thus, the client CDR 920 data consist of CDR's initiated by or to a client and pertain to particular telecommunication events. Platform CDR 922 includes data about the platform or system over which telecommunication events take place. Meta CDR 924 provides even further detailed information such as the type of phone, the location of the phone, the application utilized by the phone, other information about the phone and user. Finally, the processed data also include logs that have been collected by the platform showing various information about traffic, calls, device access, device location, etc.

As the data is collected it is fed into an ELK 930 for processing. The ELK Stack is a collection of three open-source products—Elasticsearch, Logstash, and Kibana. ELK stack provides centralized logging to identify problems with servers or applications. As such, ELK is a powerful set of tools that can be utilized for log correlation and real-time analytics. It allows for all of the logs in a system to be searched in a single place. It also helps to find issues in multiple servers by connecting logs during a specific time frame.

ELK can be utilized for systems operations monitoring as well as application monitoring and monitoring of network operations. Many environments just have the basics covered (up/down alerting and performance monitoring). Some companies go one step further and are logging syslog to a central server. ELK is particularly useful in capturing, parsing, and making searchable syslogs and SNMP traps. In essence, ELK beneficially transforms a syslog from plain text to useful data. For example, a syslog server can operate to collect the raw data 902 and processed data 904 (i.e CDRs textual logs). Logstash is filtering and parsing the logs into structured data. Elasticsearch is indexing and storing the structured data for instantaneous search capability. Kibana is a means to interact and search through the data stored in Elasticsearch.

Logstash can be used in the collecting of logs or it may work alongside of other processes, such as proprietary syslog servers. ed to install Extra Packages for Enterprise Linux (EPEL).

After the ELK 930, an AI model engine 940 can process the data to make conclusions, predictions, identify trends etc. The analyzed data can be used to create visualizations 950 to illustrate the information. The model engine 940 may utilize decision trees for processing call error logs and call failure scenarios. Further, the model engine 940 can perform step-wise analysis issue categorization.

Figure 10:
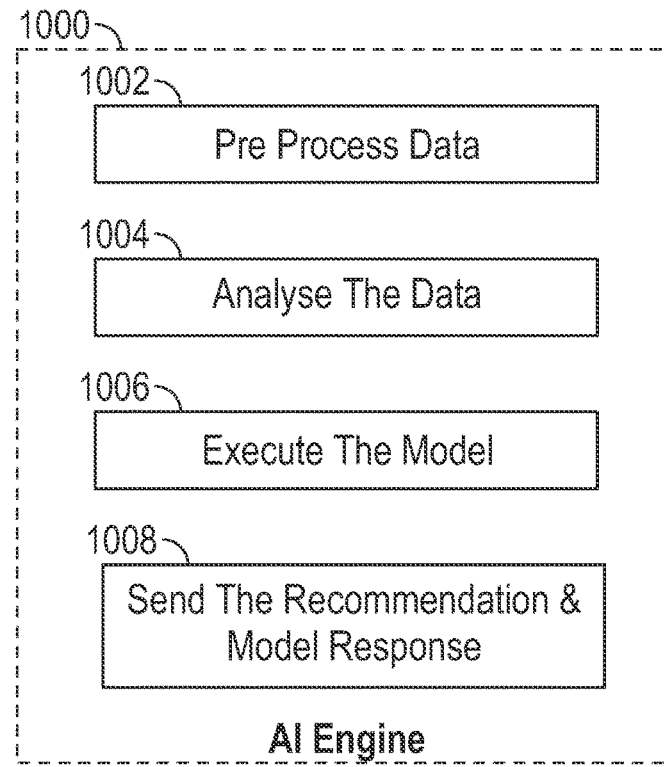
FIG. 10 is a block diagram illustrating an exemplary structure for an AI model engine such as model engine 940 of FIG. 9 for processing and analyzing the data.

FIG. 10 is a block diagram illustrating an exemplary structure for an AI model engine such as model engine 940 of FIG. 9 for processing and analyzing the data. The input into the AI model 1000 may be the output from ELK processing or some other processing that operates to gather and collate the data. The data is then sent to the AI model engine 1000 for analysis. Once the data is accepted by the AI model engine 1000, the data is pre-processed 1002. The AI engine model 1000 then analyzes the data 1004 and executes the model 1006. The execution of the model operates to get recommendations and process the model output. The output recommendation and model response is then sent to the platform server for processing 1008.

Figure 11:
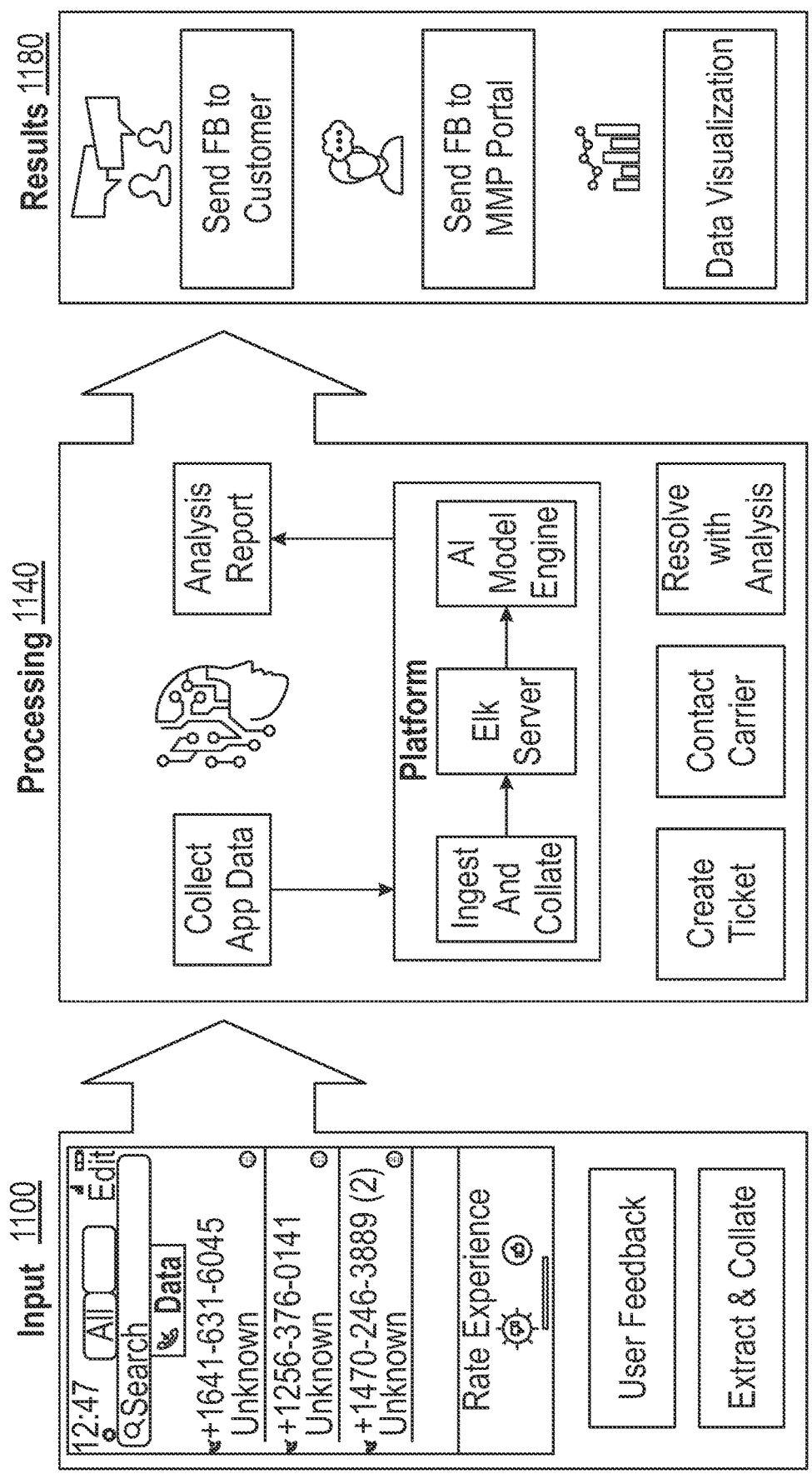
FIG. 11 is a more detailed block diagram illustrating the overall operation of embodiment of the AYRA.

FIG. 11 is a more detailed block diagram illustrating the overall operation of embodiment of the AYRA. In general, the operation of the AYRA can be described as consisting of three phases, all of which may exist linearly or simultaneously. These phases include the input phase 1100, processing phase 1140 and results phase 1180. The input phase 1100, also described in FIG. 9 and elsewhere, is illustrated as presentment of user interface to solicit feedback from the user. The user feedback may be real-time at the conclusion of a telecommunications event or it may be provided at a later date, either at the initiative of the customer or in response to the system prompting the user. The input phase 1100 also includes the attainment of CDRs, logs and other information such as by the employment of ELK or other data collection means.

The data is then operated on in the processing phase 1140, which is also described in connection with FIG. 10 and elsewhere. Processing phase 1140 includes collecting the application data and feeding it to the platform where it is ingested and collated (i.e., CDR, meta and platform logs). This information is then subjected to processing by an ELK server and then processing by the AI model engine.

Some of the possible outputs of this processing may include the creation of a ticket, such as a problem ticket that needs to be addressed, contacting the carrier or service provided to report a problem and conducting analysis to resolve the issues. Advantageously, the illustrated ARYA model allows for the tickets to be automatically created, even in real-time and include the details collected. As issues or problems are identified and determined to be system or carrier oriented, the system can raise the issues with carrier partners if required to further debug or resolve the issues.

The results are then processed in the results phase 1180 that include sending feedback to the customer, sending feedback to the MMP portal and preparing visualization of the data.

The various embodiments have been presented primarily within the environment of a MULTILINE service, such as that provided by MOVIUS. However, as has been pointed out, the various aspects, features, operations, characteristics, accomplishments and advantages of the invention can be utilized, adapted and/or deployed in a wide array of environments and applications and as such, the embodiments and examples presented herein should not limit the scope of the invention. As s few non-limiting examples, the embodiments of the present invention can be used in various apps, such as apps used for navigation, rental management, ride sharing, online ordering, online banking, telecommunications services, security for homes and buildings, entertainment, shopping, etc. The interaction with the user interfaces may be through texting, voice commands, sign language in front of a camera, keyboard data entry, etc.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for automatically adjusting a mobile telephone service based on analyzing user feedback, wherein the mobile telephone service is provided by a mobile telephone service provider, the method comprising the actions of:

the mobile telephone service provider facilitating a mobile telephone service taking the form of a communication session between a mobile telephone and another device;

providing a user interface on a display of the mobile telephone to enable users to provide a feedback pertaining to the quality of service of the communication session provided by the mobile telephone service system;

the mobile telephone receiving real-time actuations of the user interface, wherein the real-time actuations indicate feedback relevant to a quality of service the communication session;

the mobile telephone forwarding data indicative of the received actuations to a server;

the server receiving the data indicative of the received actuations;

the server obtaining call data records associated with the communication session, wherein the call data records comprises telecommunication events initiated by or to the mobile telephone, system information over which the telecommunications events take place, meta data identifying a type of the mobile telephone, a location of the mobile telephone, identification of the application utilized by the mobile telephone, and activity logs collected by the system that contain information about telecommunications traffic;

process the received data indicative of the received actuations and the obtained call records associated with the communications session;

the server providing the processed received data and the obtained call data records to an artificial intelligence (AI) engine;

the AI engine utilizing decision trees to process the received data and the obtained call records to generate adjustment recommendations based on identified trends, predictions and conclusions about the quality of service of the communication session related to the received data and the obtained call records;

provide the adjustment recommendation to the server; and in response to the generated adjustment recommendations, the server automatically adjusting the operation of telecommunications equipment utilized by the mobile telephone service provider to provide the communication session so as to improve the quality of service for the communication session based at least in part on the processed received data and call data records.

2. The method of claim 1, wherein the action of the AI engine processing the received data and the obtained call data records further comprises one or more of the actions of:

the AI engine classifying the received data based on a type of communication session;

the AI engine classifying the received data based on a type of mobile telephone used to partake in the communication session;

the AI engine classifying the received data based on the reason for the feedback; and the AI engine classifying the received data based on a particular mobile telephone service provider providing the communication session.

3. The method of claim 1, wherein the service system is a voice call and the action of the AI engine processing the received data and the call data records further comprises one or more of the actions of:

the AI engine classifying the received data based on the call being connected on a voice channel or a data channel;

the AI engine classifying the received data based on a model of mobile telephone and a software version used to partake in the call;

the AI engine classifying the received data based on the reason for the feedback; and the AI engine classifying the received data based on the mobile telephone service provider.

4. The method of claim 3, wherein the action of the server automatically adjusting the operation of telecommunications equipment further comprises identifying problem areas of a network that are associated with negative feedback and automatically making adjustments to the telecommunications equipment to improve the problem areas.

5. The method of claim 4, wherein the action of the server automatically adjusting the parameters of the mobile telephone service based at least in part on the processed received data further comprises the action of rerouting call traffic to limit the amount of call traffic processed by the identified problem areas of the network.

6. The method of claim 4, wherein the action of the server automatically adjusting the operation of telecommunications equipment utilized by the mobile telephone service provider to provide the communication session so as to improve the quality of service for the communication session further comprises the action of increasing bandwidth and signal strength for the identified problem areas of the network.

7. The method of claim 4, wherein the action of the server automatically adjusting the operation of telecommunications equipment utilized by the mobile telephone service provider to provide the communication session so as to improve the quality of service for the communication session further comprises the action of increasing resources for the identified problem areas of the network.

8. The method of claim 4, wherein the action of the server automatically adjusting the operation of telecommunications equipment utilized by the mobile telephone service provider to provide the communication session so as to improve the quality of service for the communication session further comprises opening a service request to address the identified problem areas of the network.

9. The method of claim 3, wherein the server process services a plurality of mobile telephones in communications sessions and the AI engine further operates to:

classify the received data from the plurality of mobile telephones based on the type of mobile telephones used to partake in the communication session; and identify mobile telephones of the plurality of mobile telephones that are generating negative feedback; and the server automatically adjust the operation of telecommunications equipment utilized by the mobile telephone service provider to provide the communication sessions to the plurality of mobile telephones so as to improve the quality of service for the communication sessions based at least in part on the processed received data and call data records and further notify customers that utilize problem devices to take remedial action.

10. The method of claim 3, wherein the server process services a plurality of mobile telephones in communications sessions and the AI engine further operates to:

classify the received data based on the mobile telephone service provider; and identify telecommunications equipment utilized by the mobile telephone service provider that is associated with negative feedback; and the server automatically adjust the operation of telecommunications equipment utilized by the mobile telephone service provider to provide the communication sessions to the plurality of mobile telephones so as to improve the quality of service for the communication sessions based at least in part on the processed received data and call data records by routing traffic away from the telecommunications equipment utilized by the mobile telephone service provider that is associated with negative feedback.

11. A system for automatically adjusting a mobile telephone service based on analyzing user feedback of a communication session along with call data records associated with the communication session, wherein the mobile telephone service is provided by a mobile telephone service provider, the system comprising:

a plurality of mobile devices configured to engage in a telecommunications service comprising a communication session facilitated by the mobile telephone service provide, each of the plurality of mobile devices including a user interface configured to:

solicit feedback pertaining to the communication session;

receive real-time actuations of the user interface, wherein the real-time actuations comprise feedback pertaining to the communication session; and forward data indicative of the received actuations to a server;

the server configured to:

receive the data indicative of the received actuations;

obtain call data records associated with the communication session, wherein the call data records comprises telecommunication events initiated by or to the mobile telephone, system information over which the telecommunications events take place, meta data identifying a type of the mobile telephone, a location of the mobile telephone, identification of the application utilized by the mobile telephone, and activity logs collected by the system that contain information about telecommunications traffic;

process the received data indicative of the received actuations and the obtained call records associated with the communications session;

provide the processed received data and the obtained call data records to an artificial intelligence ("AI") engine;

the AI engine configured to:
utilize decision trees to process the received data and the obtained call records to generate adjustment recommendations based on identified trends, predictions and conclusions about the quality of service of the communication session related to the received data and the obtained call records; and provide the adjustment recommendation to the server;

the server in response to receiving the generated adjustment recommendations, is configured to automatically adjust the operation of telecommunications equipment utilized by the mobile telephone service provider to provide the communication session so as to improve the quality of service for the communication session based at least in part on the processed received data and call data records.

12. The system of claim 11, wherein the AI engine is configure to process the received data by performing one or more of:

classifying the received data based on a type of mobile telephone service;

classifying the received data based on a type of device used to partake in the mobile telephone service;

classifying the received data based on the reason for feedback; and classifying the received data based on the mobile telephone service provider.

13. The system of claim 11, wherein the mobile telephone service is a call and the AI engine is configured to process the received data by performing one or more of:

the AI engine classifying the received data based the call being connected on a voice channels or a data channel;

the AI engine classifying the received data based on a model of mobile device and software version used to partake in the mobile telephone service;

the AI engine classifying the received data based on the reason for feedback; and the AI engine classifying the received data based on the mobile telephone service provider.

14. The system of claim 13, wherein the AI engine is further configured to process the received data by identifying problem areas of a network that are associated with the feedback.

15. The system of claim 14, wherein the server is configured to automatically adjust the operation of the mobile telephone service based at least in part on the adjustment recommendations by rerouting call traffic to limit the amount of call traffic processed by the identified problem areas of the network.

16. The system of claim 14, wherein the server is configured to automatically adjust the operation of the mobile telephone service based at least in part on the adjustment recommendations by increasing a bandwidth for the identified problem areas of the network.

17. The system of claim 14, wherein the server is configured to automatically adjust the operation of the mobile telephone service based at least in part on the adjustment recommendations by increasing resources for the identified problem areas of the network.

18. The system of claim 14, wherein the server is configured to automatically adjust the operation of the mobile telephone service based at least in part on the adjustment recommendations by opening a service request to address the identified problem areas of the network.

19. The system of claim 13, wherein the AI engine is configured to:

classify the received data based on a type of mobile device used to partake in the mobile telephone service by identifying problem devices that are generating negative feedback and, the server is configured to automatically adjust the operation of the mobile telephone service based at least in part on the adjustment recommendations by notifying customers that utilize problem devices to take remedial action.

20. The system of claim 13, wherein the AI engine is configured to:

classify the received data based on the mobile telephone service provider by identifying problem service providers that are associated with negative feedback and, the server is configured to automatically adjust the operation of the mobile telephone service based at least in part on the adjustment recommendations by routing traffic away from the problem service providers and notifying the problem service providers.

* * * * *